US010389010B2

(12) United States Patent
Lee et al.

(10) Patent No.: US 10,389,010 B2
(45) Date of Patent: Aug. 20, 2019

(54) ANTENNA STRUCTURE AND WIRELESS COMMUNICATION DEVICE USING SAME

(71) Applicant: Chiun Mai Communication Systems, Inc., New Taipei (TW)

(72) Inventors: Yi-Chieh Lee, New Taipei (TW); Geng-Hong Liou, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 188 days.

(21) Appl. No.: 15/657,053

(22) Filed: Jul. 21, 2017

(65) Prior Publication Data
US 2018/0026355 A1 Jan. 25, 2018

Related U.S. Application Data

(60) Provisional application No. 62/365,344, filed on Jul. 21, 2016.

(30) Foreign Application Priority Data

Jul. 18, 2017 (CN) .......................... 2017 1 0586519

(51) Int. Cl.
*H01Q 1/24* (2006.01)
*H01Q 5/335* (2015.01)
*H01Q 13/10* (2006.01)
*H01Q 9/42* (2006.01)
*H01Q 21/28* (2006.01)
*H04M 1/02* (2006.01)

(52) U.S. Cl.
CPC ............. *H01Q 1/243* (2013.01); *H01Q 5/335* (2015.01); *H01Q 9/42* (2013.01); *H01Q 13/10* (2013.01);

(Continued)

(58) Field of Classification Search
CPC .......... H01Q 1/243; H01Q 9/42; H01Q 21/28; H01Q 13/10; H01Q 5/335; H01Q 5/378;
(Continued)

(56) References Cited

U.S. PATENT DOCUMENTS 9,583,838 B2 * 2/2017 Zhu ..................... H01Q 13/10
9,728,858 B2 * 8/2017 Zhu ..................... H01Q 13/10
(Continued)

FOREIGN PATENT DOCUMENTS

CN 103296385 A 9/2013
CN 203883129 U 10/2014
(Continued)

*Primary Examiner* — Daniel Munoz
*Assistant Examiner* — Awat M Salih
(74) *Attorney, Agent, or Firm* — ScienBiziP, P.C.

(57) ABSTRACT

An antenna structure includes a metallic member, a feed portion, a ground portion and a radiating portion. The metallic member includes a front frame, a backboard, and a side frame. The side frame defines a slot. The front frame defines a first gap and a second gap, which are in communication with the slot and extend across the front frame. A straight portion of the front frame between the first gap and the second gap forms a radiating section. The feed portion and the ground portion are electrically connected to the radiating section. Current enters the radiating section from the feed portion. The current flows through the radiating section and towards the second gap. The radiating portion obtains current from the radiating section by coupling. The radiating section and the radiating portion generate radiation signals in two different frequency bands. A wireless communication device using the antenna structure is provided.

28 Claims, 29 Drawing Sheets

(52) U.S. Cl.
CPC ............ *H01Q 21/28* (2013.01); *H04M 1/026* (2013.01); *H04M 1/0264* (2013.01); *H04M 1/0283* (2013.01)

(58) Field of Classification Search
CPC ....... H01Q 5/385; H01Q 5/395; H04M 1/026; H04M 1/0264; H04M 1/0283
See application file for complete search history.

(56) References Cited

U.S. PATENT DOCUMENTS

| | | | |
|---|---|---|---|
| 2012/0112970 A1* | 5/2012 | Caballero | H01Q 1/243 343/702 |
| 2012/0299785 A1 | 11/2012 | Bevelacqua | |
| 2014/0347226 A1* | 11/2014 | Iellici | H01Q 1/243 343/702 |
| 2014/0347227 A1* | 11/2014 | Iellici | H01Q 1/243 343/702 |
| 2015/0311579 A1* | 10/2015 | Irci | H01Q 1/243 343/702 |
| 2015/0372372 A1 | 12/2015 | Lee et al. | |
| 2016/0064801 A1* | 3/2016 | Han | H01Q 1/243 343/702 |
| 2016/0351998 A1* | 12/2016 | Ahn | H01Q 9/0414 |

FOREIGN PATENT DOCUMENTS

| | | |
|---|---|---|
| CN | 105006647 A | 10/2015 |
| CN | 105789831 A | 7/2016 |

\* cited by examiner

ANTENNA STRUCTURE AND WIRELESS COMMUNICATION DEVICE USING SAME

CROSS-REFERENCE TO RELATED APPLICATIONS

This application claims priority to U.S. Patent Application No. 62/365,344 filed on Jul. 21, 2016, and claims priority to Chinese Patent Application No. 201710586519.6 filed on Jul. 18, 2017, the contents of which are incorporated by reference herein.

FIELD

The subject matter herein generally relates to an antenna structure and a wireless communication device using the antenna structure.

BACKGROUND

Metal housings, for example, metallic backboards, are widely used for wireless communication devices, such as mobile phones or personal digital assistants (PDAs). Antennas are also important components in wireless communication devices for receiving and transmitting wireless signals at different frequencies, such as wireless signals in Long Term Evolution Advanced (LTE-A) frequency bands. However, when the antenna is located in the metal housing, the antenna signals are often shielded by the metal housing. This can degrade the operation of the wireless communication device. Additionally, the metallic backboard generally defines slots or/and gaps thereon, which will affect an integrity and an aesthetic of the metallic backboard.

BRIEF DESCRIPTION OF THE DRAWINGS

Implementations of the present disclosure will now be described, by way of example only, with reference to the attached figures.

DETAILED DESCRIPTION

Figure 1:
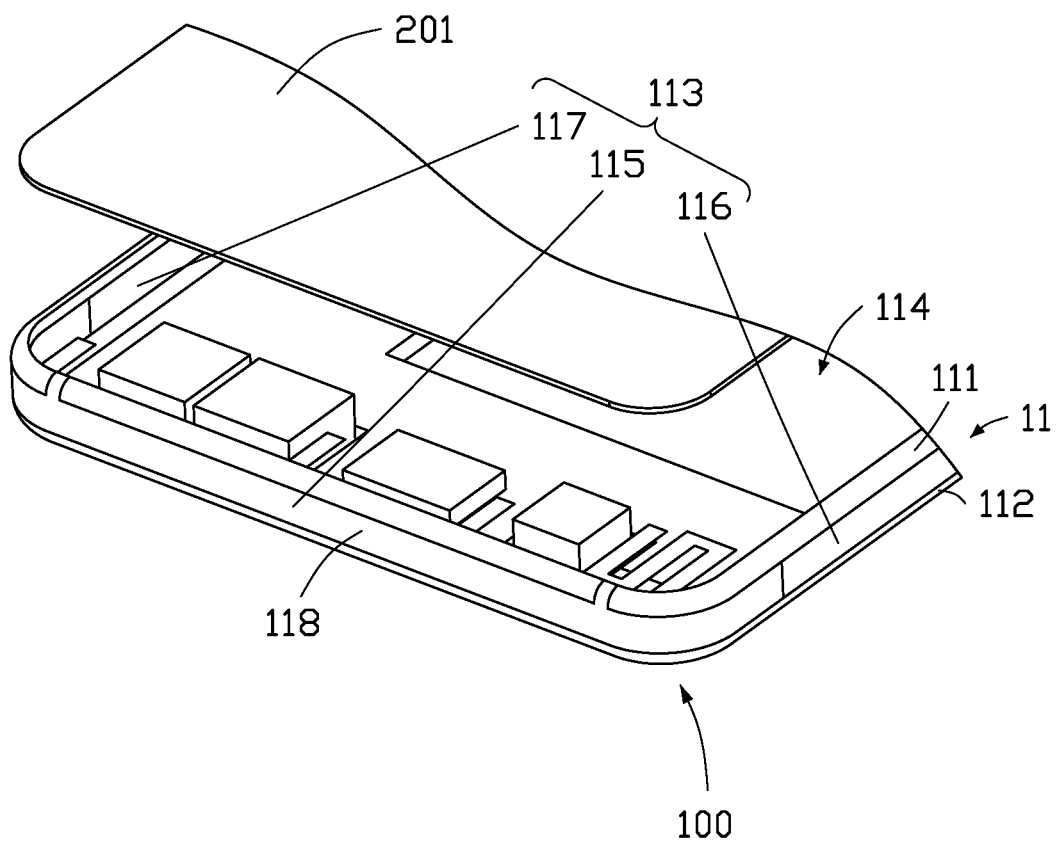
FIG. 1 is an isometric view of a first exemplary embodiment of a wireless communication device using a first exemplary antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an antenna structure and a wireless communication device using same.

FIG. 1 illustrates a first embodiment of a wireless communication device 200 using a first exemplary antenna structure 100. The wireless communication device 200 can be a mobile phone or a personal digital assistant, for example. The antenna structure 100 can receive or send wireless signals.

Figure 2:
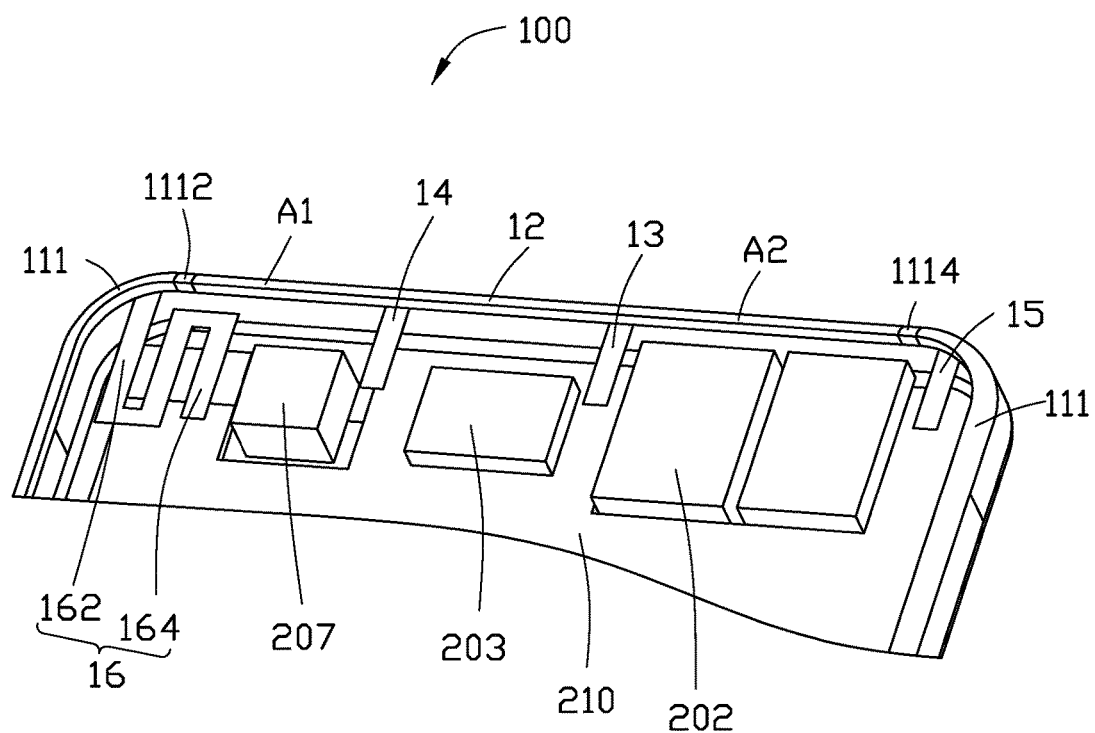
FIG. 2 is a detail view of the antenna structure of FIG. 1.
Figure 3:
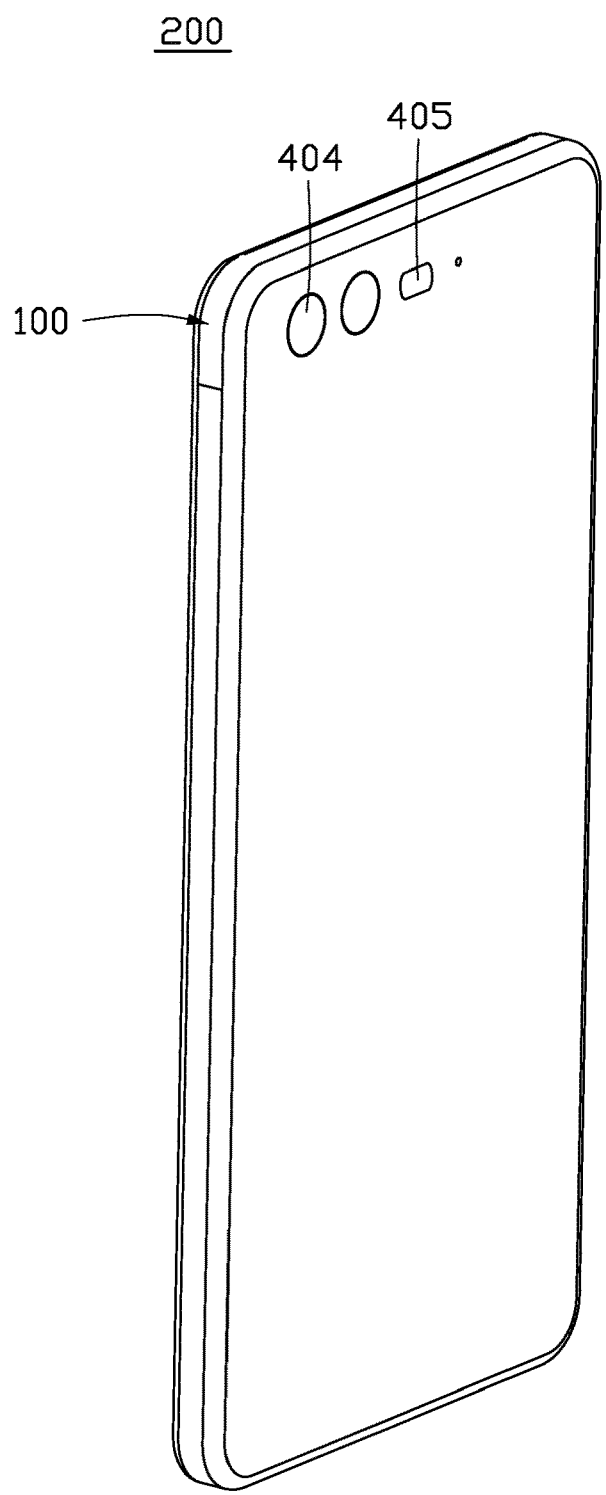
FIG. 3 is another isometric view of the wireless communication device of FIG. 1.
Figure 5:
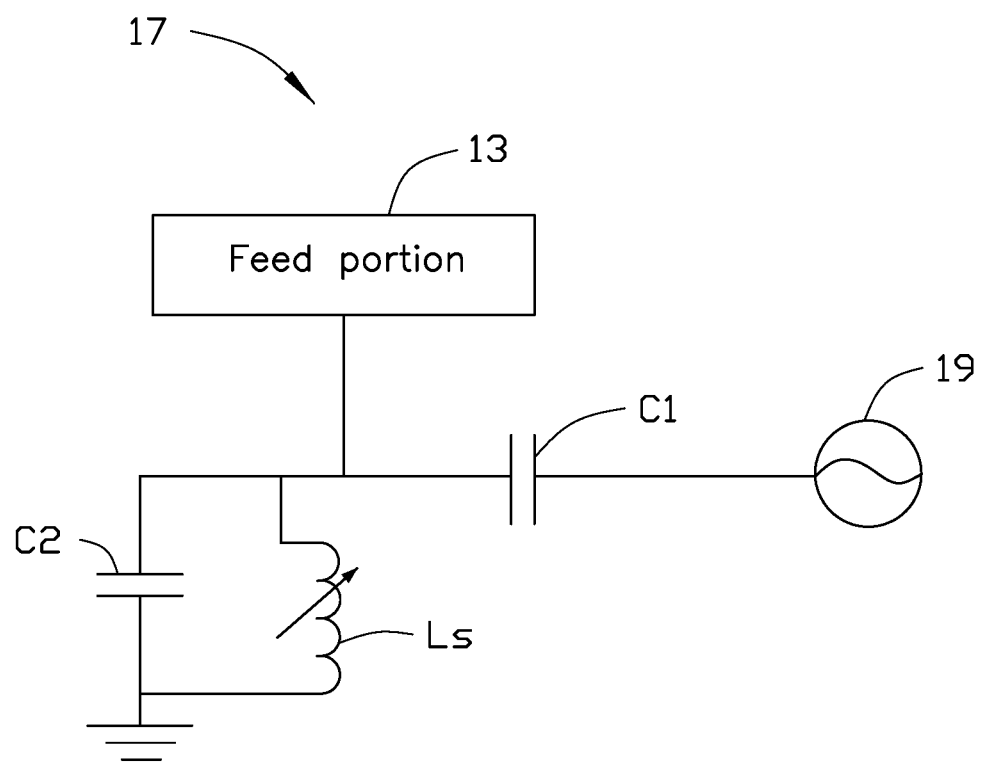
FIG. 5 is a circuit diagram of a first matching circuit of the antenna structure of FIG. 1.
Figure 6:
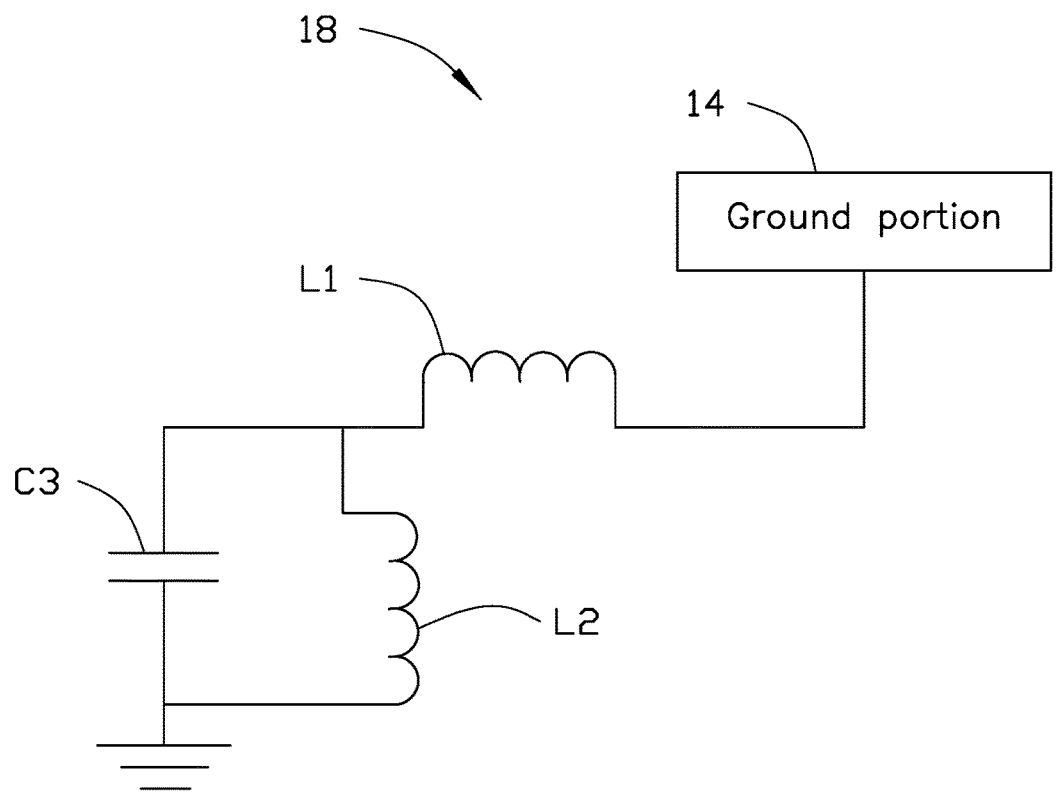
FIG. 6 is a circuit diagram of a second matching circuit of the antenna structure of FIG. 1.

Per FIGS. 1 and 2, the antenna structure 100 includes a metallic member 11, a feed portion 13, a ground portion 14, a first radiating portion 15, a second radiating portion 16, a first matching circuit 17 (shown in FIG. 5) and a second matching circuit 18 (shown in FIG. 6).

The metallic member 11 can be a metal housing of the wireless communication device 200. In this exemplary embodiment, the metallic member 11 is a frame structure and includes a front frame 111, a backboard 112, and a side frame 113 as shown in FIG. 1. The front frame 111, the backboard 112, and the side frame 113 can be integral with each other. The front frame 111, the backboard 112, and the side frame 113 cooperatively form the metal housing of the wireless communication device 200. The front frame 111 defines an opening (not shown) thereon. The wireless communication device 200 includes a display 201. The display 201 is received in the opening. The display 201 has a display surface. The display surface is exposed at the opening and is positioned parallel to the backboard 112.

The backboard 112 is positioned opposite to the front frame 111. The backboard 112 is directly connected to the side frame 113, and there is no gap between the backboard 112 and the side frame 113. The backboard 112 is a single and integrally formed metallic sheet. The backboard 112 defines the holes 204, 205 for exposing dual backside cameras 202 and a receiver 203. The backboard 112 does not define any slot, break line, or gap that divides the backboard 112. The backboard 112 serves as a ground of the antenna structure 100.

The side frame 113 is positioned between the front frame 111 and the backboard 112. The side frame 113 is positioned around a periphery of the front frame 111 and a periphery of the backboard 112. The side frame 113 forms a receiving space 114 together with the display 201, the front frame 111, and the backboard 112. The receiving space 114 can receive a print circuit board 210, a processing unit (not shown), or other electronic components or modules. In this exemplary embodiment, the electronic components or modules at least include the dual backside cameras 202, the receiver 203, and a front camera 207. The dual backside cameras 202, the receiver 203, and the front camera 207 are arranged on the print circuit board 210 and spaced apart from each other.

Referring to FIG. 1, the side frame 113 includes a top portion 115, a first side portion 116, and a second side portion 117. The top portion 115 connects the front frame 111 and the backboard 112. The first side portion 116 is spaced apart from and parallel to the second side portion 117. The top portion 115 has first and second ends. The first side portion 116 is connected to the first end of the first frame 111 and the second side portion 117 is connected to the second end of the top portion 115. The first side portion 116 connects the front frame 111 and the backboard 112. The second side portion 117 also connects the front frame 111 and the backboard 112. The side frame 113 defines a slot 118. In this exemplary embodiment, the slot 118 is defined at the top portion 115 and extends to the first side portion 116 and the second side portion 117. In other exemplary embodiments, the slot 118 can only be defined at the top portion 115 and does not extend to any one of the first side portion 116 and the second side portion 117. In other exemplary embodiments, the slot 118 can be defined only at the top portion 115, but not extending to any of the first side portion 116 and the second side portion 117. In other exemplary embodiments, the slot 118 can be defined at the top portion 115 and extends to one of the first side portion 116 and the second side portion 117.

Referring to FIGS. 1 and 2, the front frame 111 includes a top arm (not labeled) corresponding to the top portion 115 and two side arms (not labeled) corresponding to the first side portion 116 and the second side portion 117. The front frame 111 defines a first gap 1112 and a second gap 1114 at the top arm. The gaps 1112, 1114 are in communication with the slot 118 and extend across the front frame 111. A straight portion of the front frame 111 between the first gap 1112 and the second gap forms a radiating section 12. In this exemplary embodiment, the first gap 1112 and the second gap 1114 are defined on the top arm of the front frame 111. The first gap 1112 and the second gap 1114 are respectively disposed adjacent to corners on opposite ends of the top arm, the radiating section 12 is a straight arm. In this exemplary embodiment, the slot 118 and the gaps 1112, 1114 are filled with insulating material, for example, plastic, rubber, glass, wood, ceramic, or the like, thereby isolating the radiating section 12 and the backboard 112.

In this exemplary embodiment, except for the slot 118 and the gaps 1112, 1114, an upper half portion of the front frame 111 and the side frame 113 does not define any other slot, break line, and/or gap. That is, there are only the gaps 1112, 1114 defined on the upper half portion of the front frame 111.

Referring to FIG. 2, one end of the feed portion 13 is electrically connected to the radiating section 12 and is near the second gap 1114, the other end electrically connects to a feed source 19 (shown in FIG. 5) through the first matching circuit 17, thus the feed portion 13 feeds in current for the radiating section 12. In this exemplary embodiment, after the current is fed into the feed portion 13, the current flows towards the first gap 1112 and the second gap 1114 along the radiating section 12. Thus, the radiating section 12 is divided into a long portion A1 and a short portion A2 by a connecting point of the feed portion 13. The long portion A1 extends towards the first gap 1112 and the short portion A2 extends towards the second gap 1114 from the connecting point of the feed portion 13. In this exemplary embodiment, the connecting point of the feed portion 13 is not positioned at a middle portion of the radiating section 12. The long portion A1 is longer than the short portion A2. One end of the ground portion 14 electrically connects to the radiating section 12 and is near the first gap 1112, the other end connects to the ground through the second matching circuit 18. The feed portion 13 and the ground portion 14 are both substantially straight arms.

The first matching circuit 17 is arranged on the printed circuit board 210. Per FIG. 5, the first matching circuit 17 includes a first capacitor C1, a second capacitor C2, and an adjustable inductor Ls. The feed portion 13 electrically connects to the feed source 19 through the first capacitor C1. One end of the second capacitor C2 is electrically connected between the feed portion 13 and the first capacitor C1, the other end electrically connects to the ground. One end of the adjustable inductor Ls is electrically connected between the feed portion 13 and the first capacitor C1, the other end electrically connects to the ground. The adjustable inductor Ls may be switched to have different inductances. In this exemplary embodiment, a capacitance of the first capacitor C1 can be 1.3 picofarad (pF), a capacitance of the second capacitor C2 can be 1.5 pF. In other embodiments, the adjustable inductor Ls can be replaced by a set of a switch and a plurality of inductors, which may be switched to different inductances.

The second matching circuit 18 is arranged on the printed circuit board 210. Per FIG. 6, the second matching circuit 18 includes a first inductor L1, a second inductor L2, and a third capacitor C3. One end of the first inductor L1 electrically connects to the ground portion 14, the other end electrically connects to the ground through the third capacitor C3. One end of the second inductor L2 is electrically connected between the first inductor L1 and the third capacitor C3 the other end electrically connects to the ground. In this exemplary embodiment, an inductance of the first inductor L1 can be 2.7 nanohenry (nH), an inductance of the second inductor L2 can be 10 nH, a capacitance of the third capacitor C3 can be 1 pF.

The feed portion 13 feeds current from the feed source 19 into the radiating section 12 through the first matching circuit 17. The current flows through the short portion A2 and towards the second gap 1114, and flows through the long portion A1 and towards the first gap 1112, and further flows to the ground portion 14 and the second matching circuit 18, thus activating a first mode to generate radiation signals in a first frequency band. In this exemplary embodiment, the first mode includes an LTE-A (Long Term Evolution Advanced) low frequency operation mode and an LTE-A middle frequency operation mode, while the first frequency band includes a frequency band of about 700-900 MHz and a frequency band of about 1800-1900 MHz. The feed portion 13 feeds current from the feed source 19 into the radiating section 12 through the first matching circuit 17, the current flows through the long portion A1 and towards the first gap 1112, and further flows to the ground portion 14 and the second matching circuit 18, thus activating a second mode to generate radiation signals in a second frequency band. In this exemplary embodiment, the second mode is a Global Positioning System (GPS) mode, the second frequency band is a frequency band of about 1575 MHz. The feed portion 13 feeds current from the feed source 19 into the radiating section 12 through the first matching circuit 17, the current flows through the short portion A2 and towards the second gap 1114, thus activating a third mode to generate radiation signals in a third frequency band. In this exemplary embodiment, the third mode is an LTE-A high frequency operation mode, the third frequency band is a frequency band of about 2200-2300 MHz. Through adjusting the inductance of the adjustable inductor Ls, the long portion A1, the short portion A2, and the feed portion 13 can be switched to connect with the adjustable inductor Ls with different inductances, the LTE-A low frequency band can be adjusted, for example, the LTE-A low frequency band can be offset towards a lower frequency or towards a higher frequency (relative to each other). Thus, the first matching circuit 17, the feed portion 13, the short portion A2, the long portion A1, the ground portion 14, and the second matching circuit 18 cooperatively integrate functions of a diversity antenna and a GPS antenna.

The first radiating portion 15 is a substantially straight arm. The first radiating portion 15 electrically connects to an end of the front frame 111 opposite to the radiating section 12 and is adjacent to the second gap 1114. The first radiating portion 15 obtains current from the short portion A2 by coupling, thus activating a fourth mode to generate radiation signals in a fourth frequency band. In this exemplary embodiment, the fourth mode is an LTE-A high frequency operation mode, the fourth frequency band is a frequency band of about 2500-2700 MHz.

The second radiating portion 16 includes a first arm 162 and a second arm 164. The first arm 162 is substantially L-shaped and has one end connecting to an end of the front frame 111 opposite to the radiating section 12 and is adjacent to the first gap 1112, and extends towards the receiving space 114. The second arm 164 is substantially U-shaped and has one end connecting to an end of the first arm 162 away from the front frame 111. The second radiating portion 16 obtains current from the long portion A1 by coupling, thus activating a fifth mode to generate radiation signals in a fifth frequency band. In this exemplary embodiment, the fifth mode includes a WiFi 2.4G mode and a WiFi 5G mode, while the fifth frequency band is a frequency band of about 2450 MHz and 5500 MHz. In other embodiments, one end of the second arm 164 away from the first arm 162 can be electrically connected to a feed source and obtains current for the second radiating portion 16.

In this exemplary embodiment, to obtain preferred antenna characteristics, a thickness of the wireless communication device 200 can be 7.43 millimeters. A width of the slot 118 can be 3.5 millimeter, that is a distance between the backboard 112 and the radiating section 12, the second radiating section 24, and the third radiating section 26 can be 3.5 millimeter, thus to improve antenna characteristic for the radiating sections by being spaced apart from the backboard 112. The width of the slot 118 is adjustable from 3 to 4.5 millimeters. A width of each of the gaps 1112, 1114 can be 2 millimeter, which may further improve antenna characteristic for the radiating sections. The width of each of the gaps 1112, 1114 is adjustable from 1.5 to 2.5 millimeters.

Referring to FIG. 2, in this exemplary embodiment, the feed portion 13 is between the dual backside cameras 202 and the receiver 203. The ground portion 14 is between the receiver 203 and the front camera 207. The first radiating portion 15 is on a side of the dual backside cameras 202 away from the feed portion 13. The second radiating portion 16 is on a side of the front camera 207 away from the ground portion 14.

Figure 4:
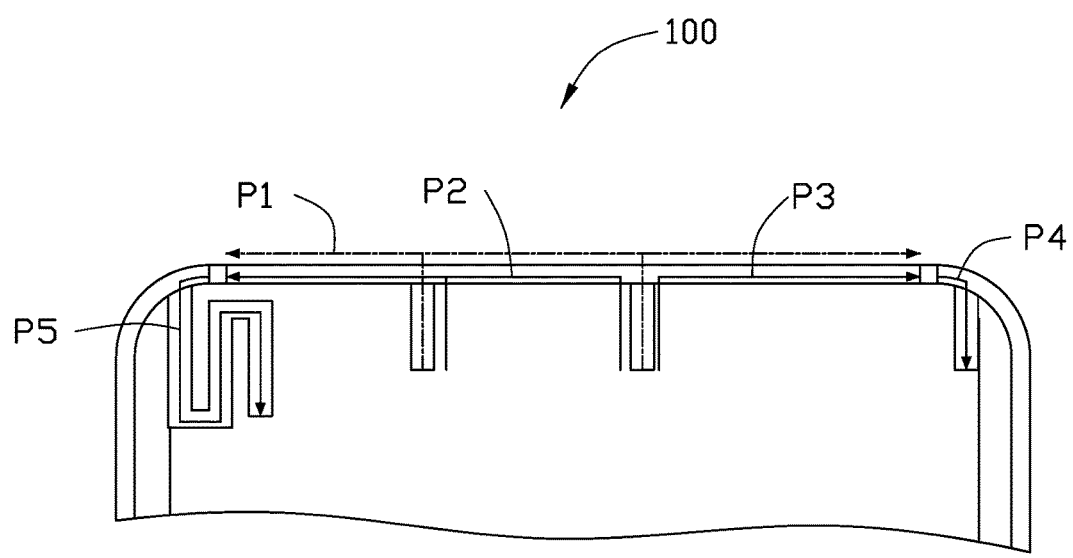
FIG. 4 is a current path distribution graph when the antenna structure of FIG. 1 is in operation.

Per FIG. 4, when the current enters the radiating section 12 from the feed portion 13, the current flows towards two direction, one direction flows through the long portion A1 and towards the first gap 1112 and the ground portion 14, meanwhile the other direction flows through the short portion A2 and towards the second gap 1114 (please see a path P1), thus activating the LTE-A low frequency operation mode and the LTE-A middle frequency operation mode. The current in the radiating section 12 flows through the long portion A1 and towards the first gap 1112 and the ground portion 14 (please see a path P2), thus activating the GPS mode. The current in the radiating section 12 flows through the short portion A2 and towards the second gap 1114 (please see a path P3), thus, activating the LTE-A high frequency operation mode (2200-2300 MHz). The first radiating portion 15 obtains current from the short portion A2 by coupling, the current flows through the first radiating portion 15 (please see a path P4), thus, activating the LTE-A high frequency operation mode (2500-2700 MHz). The second radiating portion 16 obtains current from the long portion A1 by coupling or by directly feeding, the current flows through the second radiating portion 16 (please see a path P5), thus, activating the WiFi 2.4G mode and the WiFi 5G mode.

The backboard 112 serves as the ground of the antenna structure 100. Perhaps, a middle frame or a shielding mask (not shown) also may serves as the ground of the antenna structure 100, the middle frame can be a shielding mask for shielding electromagnetic interference arranged on the display 201 facing the backboard 112. The shielding mask or the middle frame can be made of metal material. The shielding mask or the middle frame may connect to the backboard 112 to form a greater ground for the antenna structure 100. In summary, each ground portion directly or indirectly connects to the ground.

Figure 7:
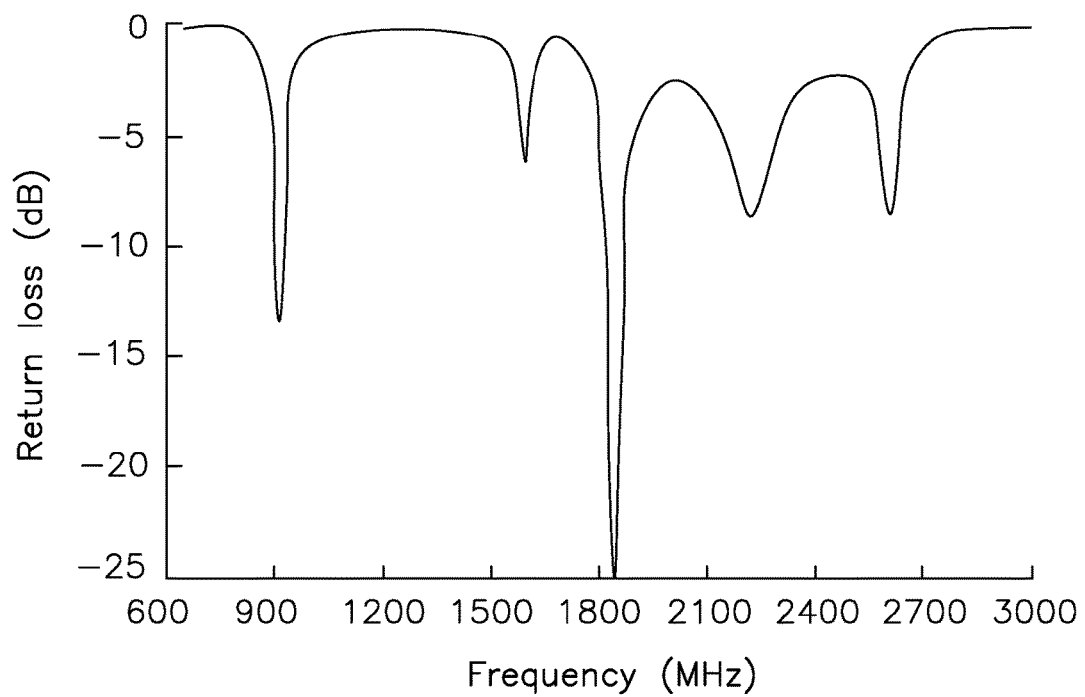
FIG. 7 is a return loss (RL) graph when the antenna structure of FIG. 1 is in operation.

FIG. 7 illustrates a return loss (RL) graph of the antenna structure 100 in operation. The antenna structure 100 can work at LTE-A low frequency operation band, LTE-A middle frequency operation band, and LTE-A high frequency operation band, and covers operation frequency bands of 2G, 3G, and 4G.

Figure 8:
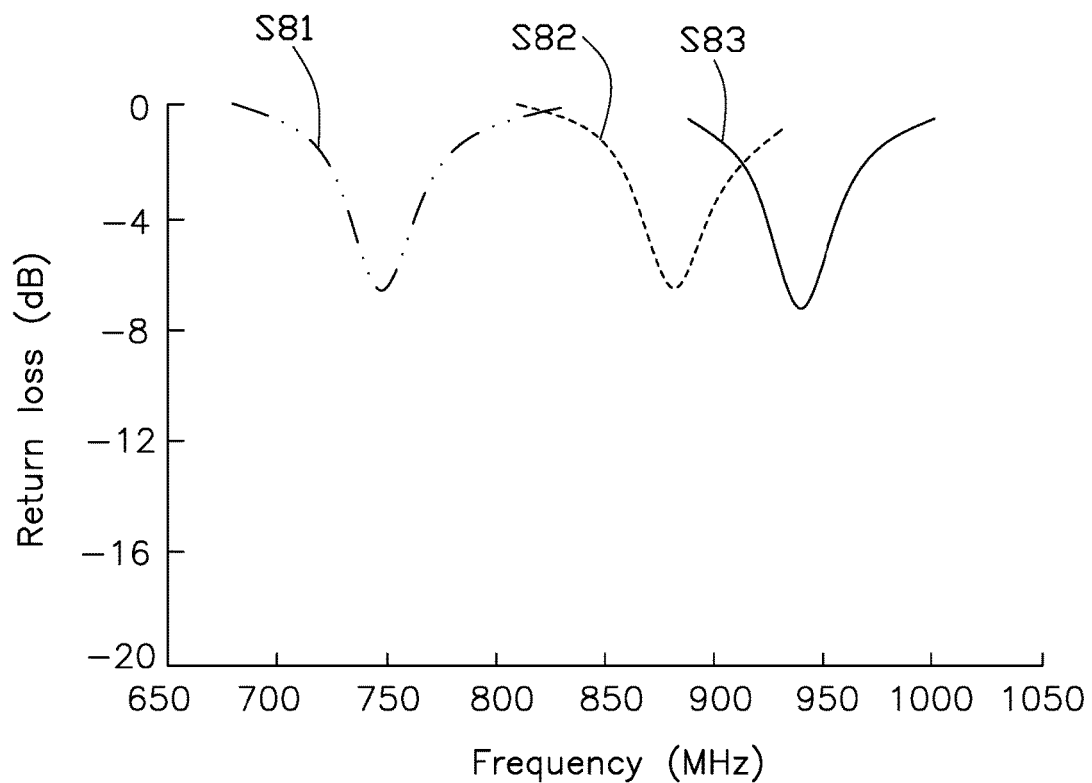
FIG. 8 is a return loss (RL) graph when the antenna structure of FIG. 1 operates at an LTE-A low frequency operation mode.

FIG. 8 illustrates a return loss (RL) graph when the antenna structure 100 operates at the LTE-A low frequency operation mode. The adjustable inductor Ls of the first matching circuit 17 can be adjusted with different inductances, thus adjusting the LTE-A low frequency operation mode. Curve S81 illustrates a return loss when the antenna structure 100 operates at an LTE-A low frequency of 700 MHz and when the adjustable inductor Ls is adjusted to be 9.1 nH. Curve S82 illustrates a return loss when the antenna structure 100 operates at an LTE-A low frequency of 850 MHz and when the adjustable inductor Ls is adjusted to be 5.4 nH. Curve S83 illustrates a return loss when the antenna structure 100 operates at an LTE-A low frequency of 900 MHz and when the adjustable inductor Ls is adjusted to be 4.3 nH.

Figure 9:
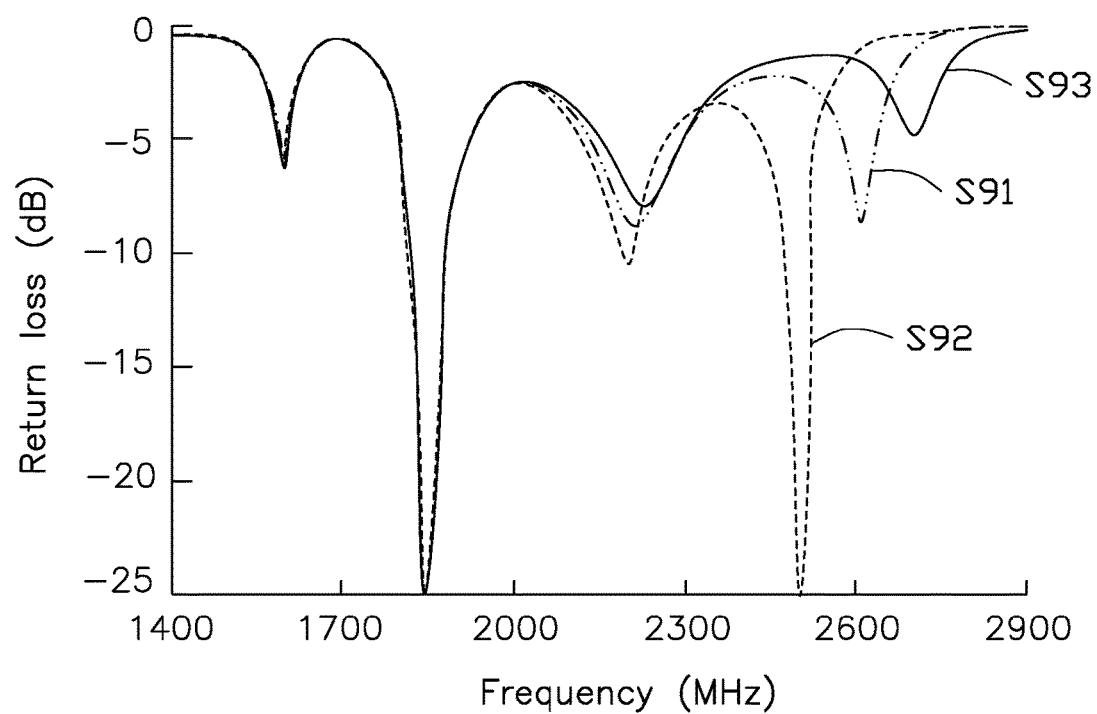
FIG. 9 is a return loss (RL) graph when the antenna structure of FIG. 1 in operation and has a first radiating portion with different sizes.

FIG. 9 illustrates a return loss (RL) graph when the antenna structure 100 in operation and has the first radiating portion 15 with different sizes. Curve S91, illustrates a return loss when the antenna structure 100 in operation and when the first radiating portion 15 has a length of 11.8 millimeter. Curve S92, illustrates a return loss when the antenna structure 100 in operation and when the first radiating portion 15 has a length of 13.8 millimeter. Curve S93, illustrates a return loss when the antenna structure 100 in operation and when the first radiating portion 15 has a length of 9.8 millimeter. Thus, from the FIG. 9, the LTE-A high frequency operation mode can be broaden by adjusting the size of the first radiating portion 15.

Figure 10:
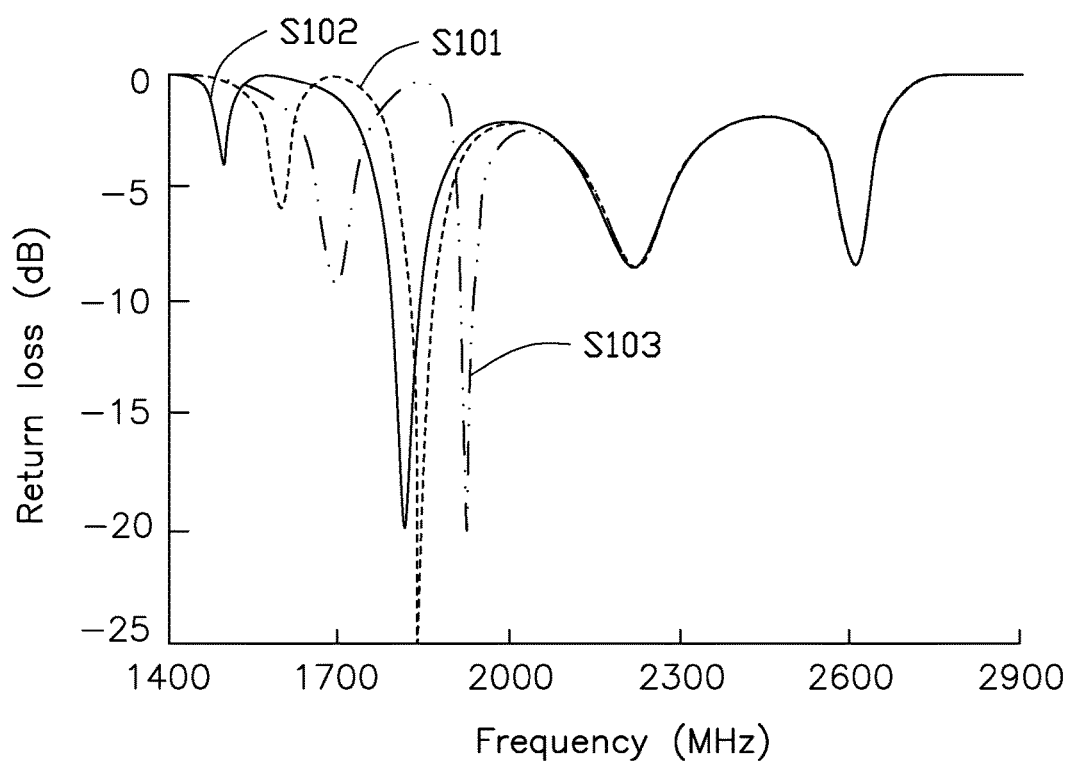
FIG. 10 is a return loss (RL) graph when the antenna structure of FIG. 1 in operation and has a third capacitor of the second matching circuit with different capacitances.

FIG. 10 illustrates a return loss (RL) graph when the antenna structure 100 in operation and has the third capacitor C3 of the second matching circuit 18 with different capacitances. Curve S101 illustrates a return loss when the antenna structure 100 in operation and when the capacitance of the third capacitor C3 is 1 pF. Curve S102 illustrates a return loss when the antenna structure 100 in operation and when the capacitance of the third capacitor C3 is 1.2 pF. Curve S103 illustrates a return loss when the antenna structure 100 in operation and when the capacitance of the third capacitor C3 is 0.8 pF. Thus, from the FIG. 10, the LTE-A high frequency operation mode can be broaden by adjusting the capacitance of the third capacitor C3, and increase operation frequency bands, for example, the GPS frequency band.

Figure 11:
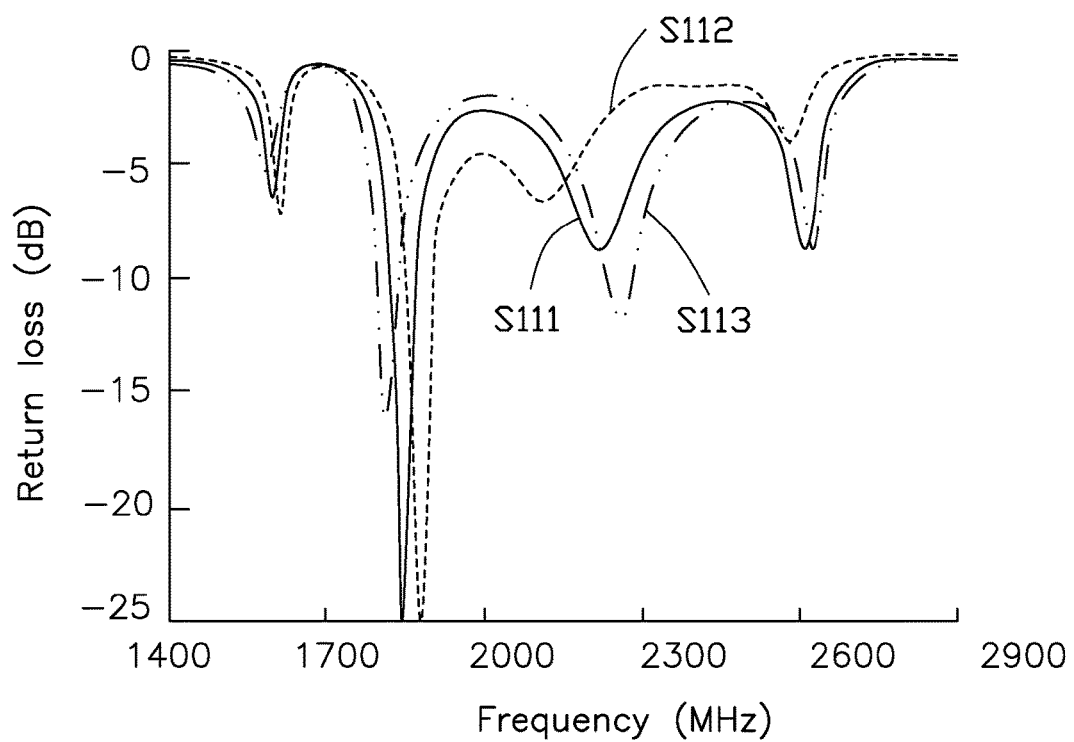
FIG. 11 is a return loss (RL) graph when the antenna structure of FIG. 1 in operation and has different connecting positions of a feed portion.

FIG. 11 illustrates a return loss (RL) graph when the antenna structure 100 in operation and has different connecting positions of the feed portion 13. Curve S111 illustrates a return loss when the antenna structure 100 in operation and when the feed portion 13 is in the present position. Curve S112 illustrates a return loss when the antenna structure 100 in operation and when the feed portion 13 is left shifted (shifted towards the first gap 1112) 1.5 millimeter. Curve S113 illustrates a return loss when the antenna structure 100 in operation and when the feed portion 13 is fight shifted (shifted towards the second gap 1114) 1.5 millimeter.

Figure 12:
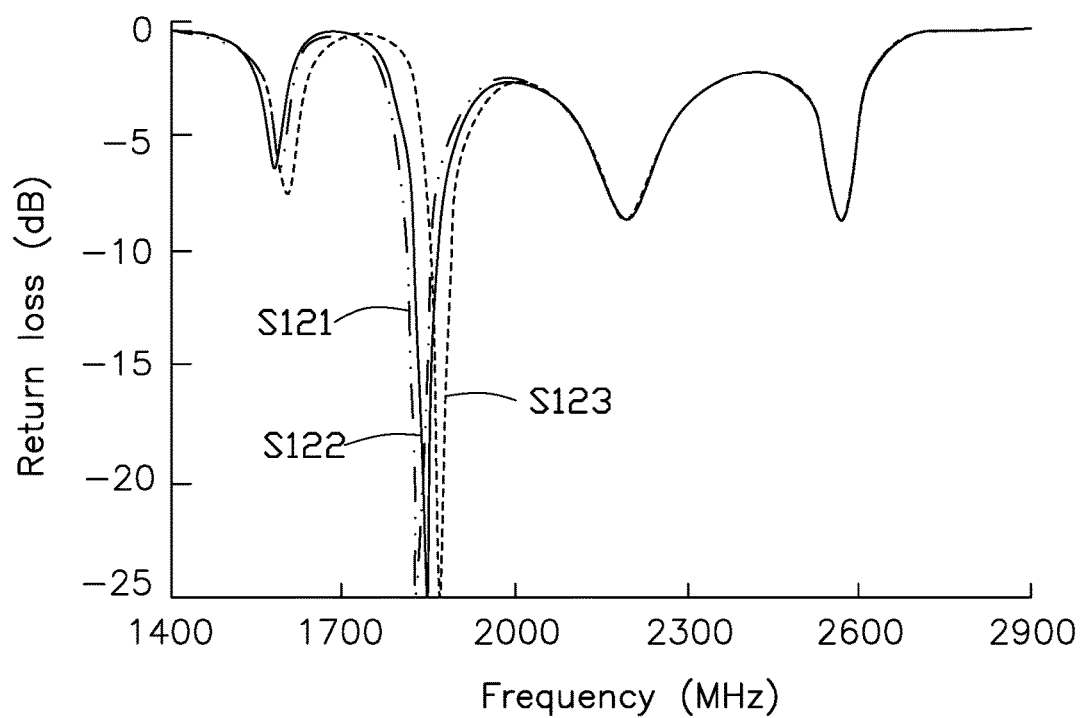
FIG. 12 is a return loss (RL) graph when the antenna structure of FIG. 1 in operation and has different connecting positions of a ground portion.

FIG. 12 illustrates a return loss graph when the antenna structure 100 in operation and has different connecting positions of the ground portion 14. Curve S121 illustrates a return loss when the antenna structure 100 in operation and when the ground portion 14 is in the present position. Curve S122 illustrates a return loss when the antenna structure 100 in operation and when the ground portion 14 is left shifted (shifted towards the first gap 1112) 1.5 millimeter. Curve S123 illustrates a return loss when the antenna structure 100 in operation and when the ground portion 14 is right shifted (shifted towards the second gap 1114) 1.5 millimeter. Thus, from FIGS. 11 and 12, the aforementioned frequency bands can be broaden by adjusting connecting positions of the feed portion 13 and the ground portion 14 to the radiating section 12.

Figure 13:
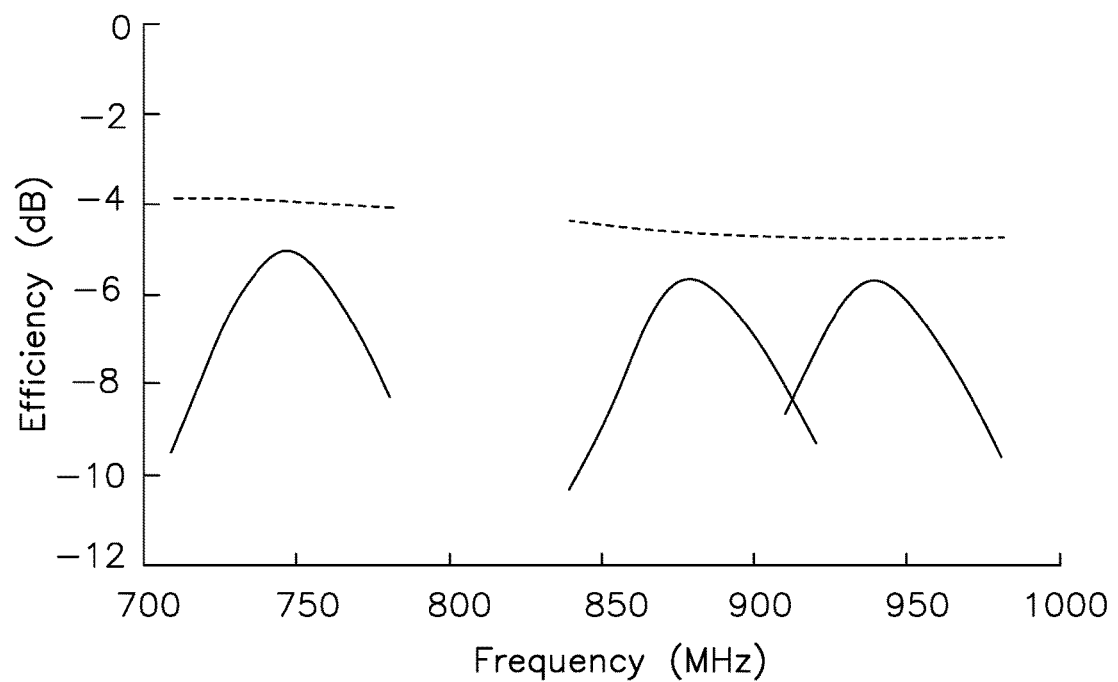
FIG. 13 is a radiating efficiency graph when the antenna structure of FIG. 1 operates at the LTE-A low frequency operation mode.

FIG. 13 illustrates a radiating efficiency graph of the antenna structure 100 in operation. The dotted line illustrates a radiating efficiency of the antenna structure 100; the solid line illustrates a total radiating efficiency of the antenna structure 100. The antenna structure 100 may operate at the frequency band of 700-960 MHz and has a radiating efficiency greater than −6.5 dB.

Figure 14:
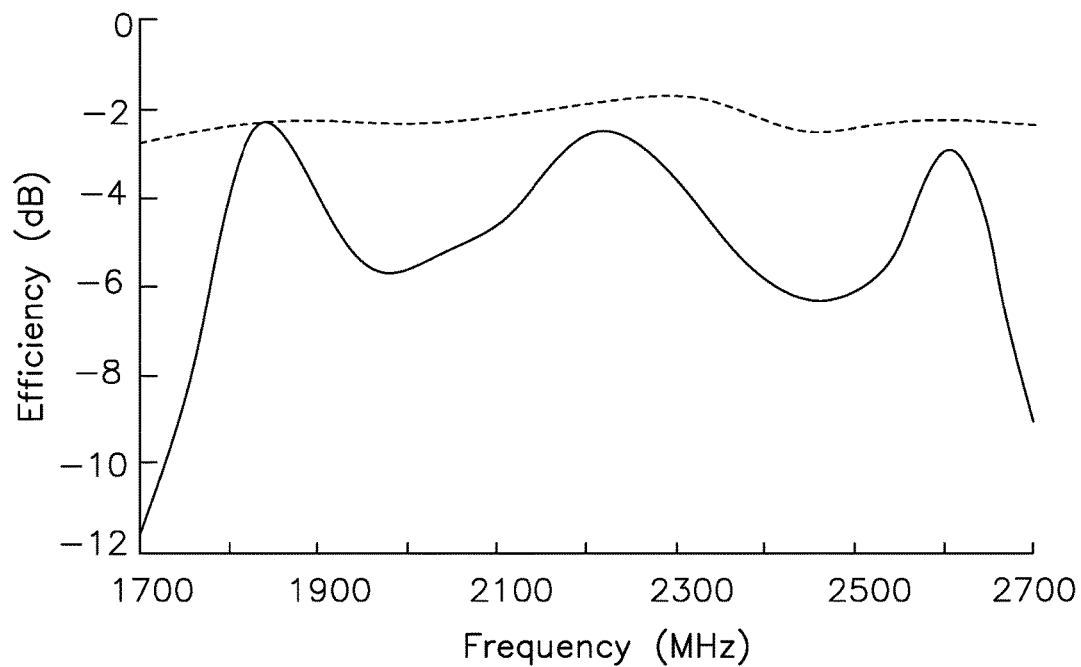
FIG. 14 is a radiating efficiency graph when the antenna structure of FIG. 1 operates at an LTE-A middle frequency operation mode and an LTE-A high frequency operation mode.

FIG. 14 illustrates a radiating efficiency graph when the antenna structure 100 operates at the LTE-A middle frequency operation mode and the LTE-A high frequency operation mode. The dotted line illustrates a radiating efficiency of the antenna structure 100; the solid line illustrates a total radiating efficiency of the antenna structure 100. The antenna structure 100 may operate at the frequency band of 1805-2690 MHz and has a radiating efficiency greater than −5.5 dB.

Per FIGS. 7 to 14, the antenna structure 100 can work at a low frequency band, for example, LTE-A low frequency band (700-960 MHz), at a middle frequency band (1800-1900 MHz), and at high frequency bands (2200-2300 MHz and 2500-2700 MHz). The antenna structure 100 can also work at the GPS frequency band (1575 MHz), WiFi 2.4G frequency band (2450 MHz) and the WiFi 5G frequency band (5500 MHz). That is, the antenna structure 100 can work at the low frequency band, the middle frequency band, and the high frequency band. When the antenna structure 100 operates at these frequency bands, a working frequency satisfies a design of the antenna and also has a good radiating efficiency.

The antenna structure 100 includes the metallic member 11 and the backboard 112. The metallic member 11 defines the slot on the side frame 113 and the gaps on the front frame 111. The backboard 112 is an integrally formed metallic sheet without other slot, break line, and/or gap, which maintains integrity and aesthetics.

Figure 15:
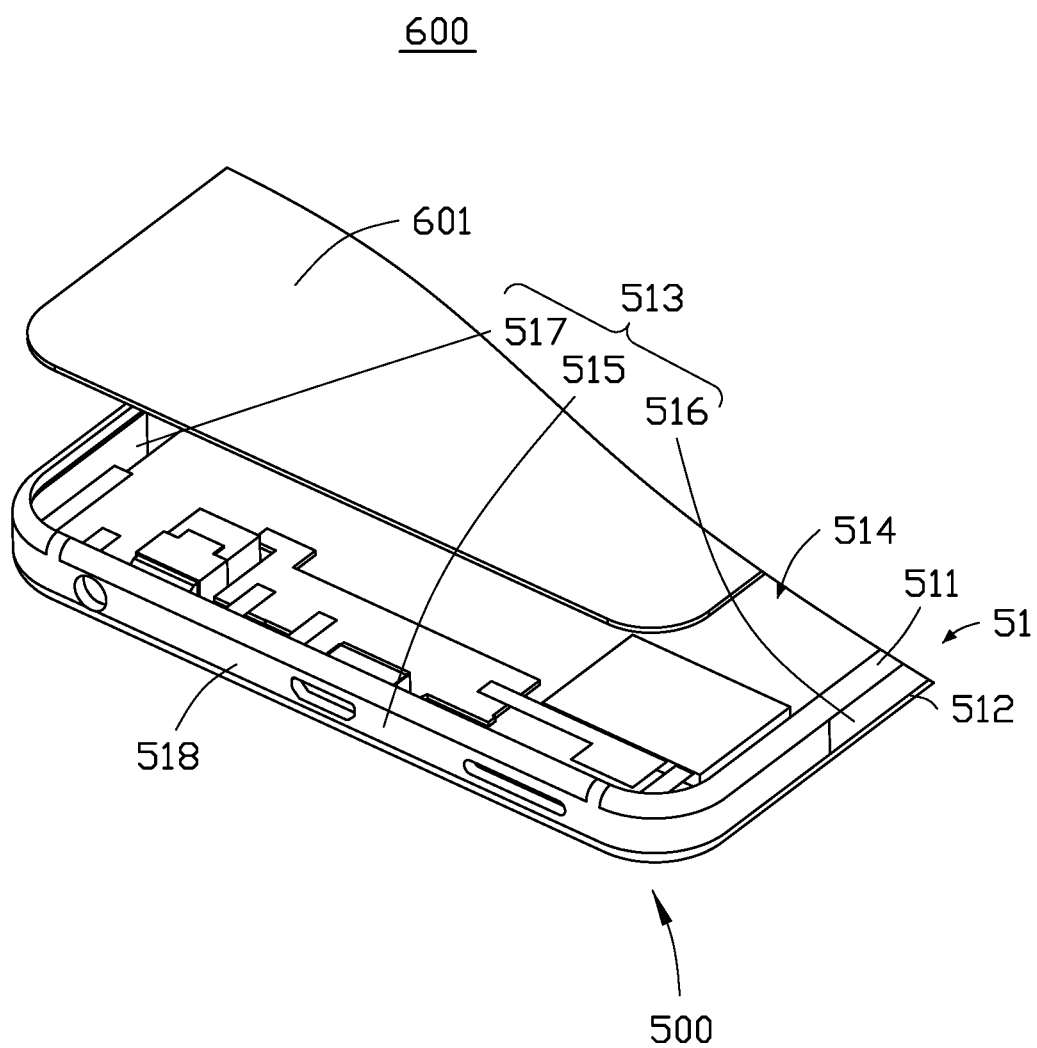
FIG. 15 is an isometric view of a second exemplary embodiment of a wireless communication device using a second exemplary antenna structure.

FIG. 15 illustrates a second embodiment of a wireless communication device 600 using a second exemplary antenna structure 500. The wireless communication device 600 can be a mobile phone or a personal digital assistant, for example. The antenna structure 500 can receive or send wireless signals.

Figure 16:
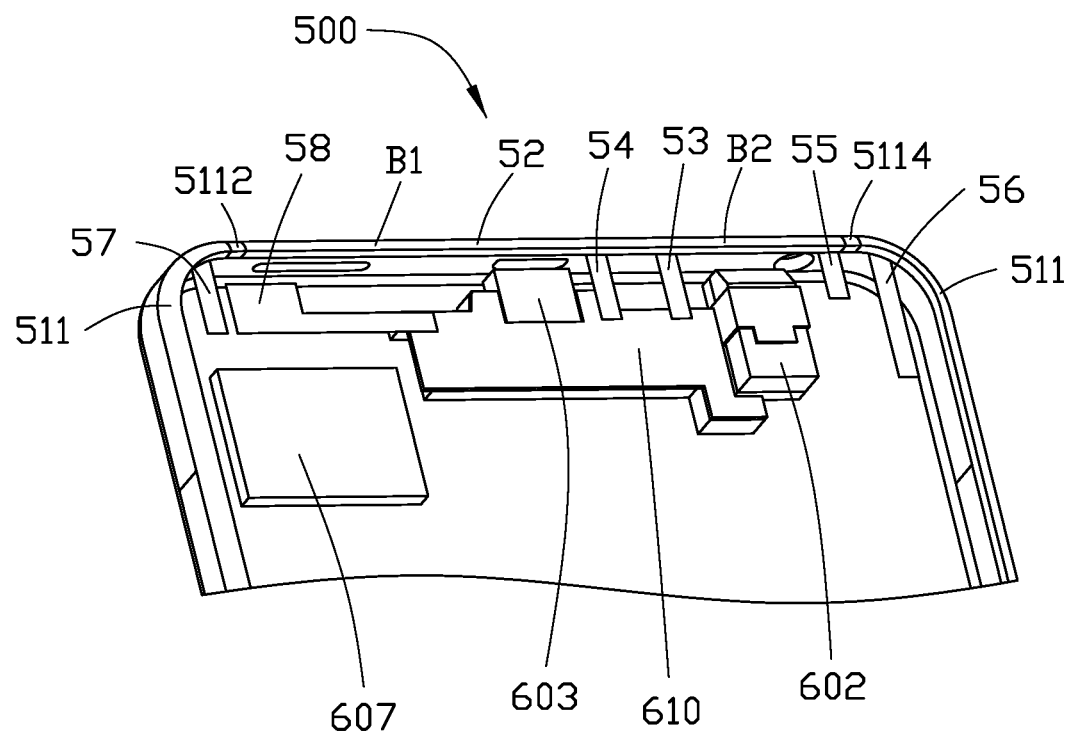
FIG. 16 is detailed view of the antenna structure of the wireless communication device of FIG. 15.
Figure 17:
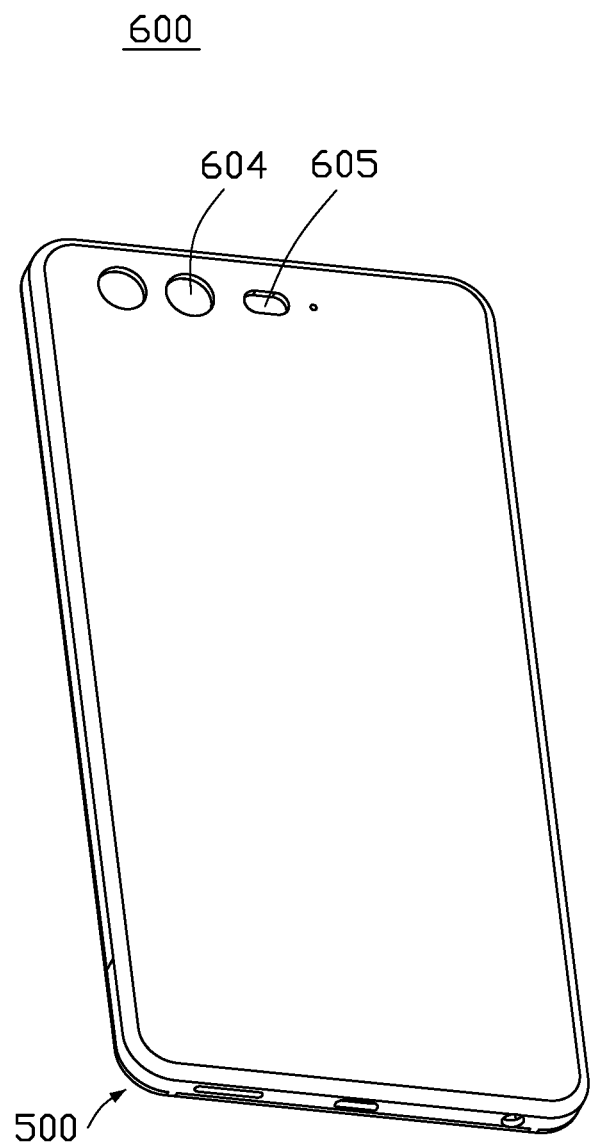
FIG. 17 is another isometric view of the wireless communication device of FIG. 15.
Figure 20:
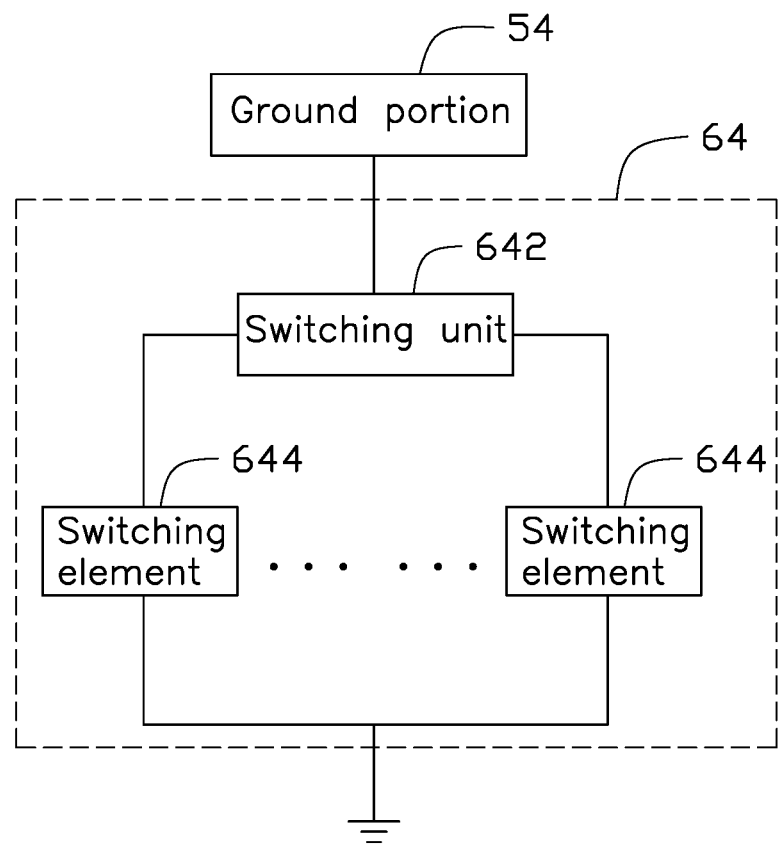
FIG. 20 is a circuit diagram of a second matching circuit of the antenna structure of FIG. 15.
Figure 21:
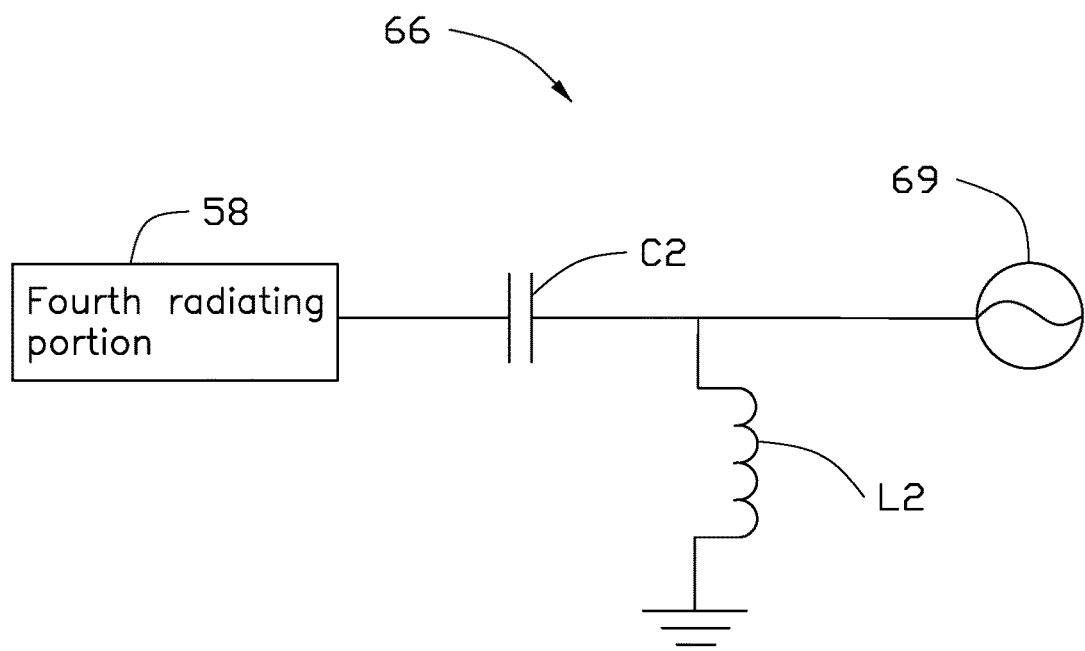
FIG. 21 is a circuit diagram of a third matching circuit of the antenna structure of FIG. 15.

Per FIGS. 15 and 16, the antenna structure 500 includes a metallic member 51, a feed portion 53, a ground portion 54, a first radiating portion 55, a second radiating portion 56, a third radiating portion 57, a fourth radiating portion 58, a first matching circuit 62 (shown in FIG. 19), a second matching circuit 64 (shown in FIG. 20), and a third matching circuit 66 (shown in FIG. 21).

The metallic member 51 can be a metal housing of the wireless communication device 600. In this exemplary embodiment, the metallic member 51 is a frame structure and includes a front frame 511, a backboard 512, and a side frame 513. The front frame 511, the backboard 512, and the side frame 513 can be integral with each other. The front frame 511, the backboard 512, and the side frame 513 cooperatively form the metal housing of the wireless communication device 600. The front frame 511 defines an opening (not shown) thereon. The wireless communication device 600 includes a display 601. The display 601 is received in the opening. The display 601 has a display surface. The display surface is exposed at the opening and is positioned parallel to the backboard 512.

The backboard 512 is positioned opposite to the front frame 511. The backboard 512 is directly connected to the side frame 513, and there is no gap between the backboard 512 and the side frame 513. The backboard 512 is a single and integrally formed metallic sheet. The backboard 512 defines the holes for exposing dual backside cameras and a receiver. The backboard 512 does not define any slot, break line, or gap that divides the backboard 512. The backboard 512 serves as a ground of the antenna structure 500.

The side frame 513 is positioned between the front frame 511 and the backboard 512. The side frame 513 is positioned around a periphery of the front frame 511 and a periphery of the backboard 512. The side frame 513 forms a receiving space 514 together with the display 601, the front frame 511, and the backboard 512. The receiving space 514 can receive a print circuit board 610, a processing unit, or other electronic components or modules. In this exemplary embodiment, the electronic components or modules at least include an audio jack 602 and a USB connector 603. The audio jack 602 and the USB connector 603 are arranged on the print circuit board 610 and spaced apart from each other.

The side frame 513 includes a bottom portion 515, a first side portion 516, and a second side portion 517. The bottom portion 515 connects the front frame 511 and the backboard 512. The first side portion 516 is spaced apart from and parallel to the second side portion 517. The bottom portion 515 has first and second ends. The first side portion 516 is connected to the first end of the first frame 311 and the second side portion 517 is connected to the second end of the bottom portion 515. The first side portion 516 connects the front frame 511 and the backboard 512. The second side portion 517 also connects the front frame 511 and the backboard 512. The side frame 513 defines a slot 518. In this exemplary embodiment, the slot 518 is defined at the bottom portion 515 and extends to the first side portion 516 and the second side portion 517. In other exemplary embodiments, the slot 518 can only be defined at the bottom portion 515 and does not extend to any one of the first side portion 516 and the second side portion 317. In other exemplary embodiments, the slot 518 can be defined only at the bottom portion 515, but not extending to any of the first side portion 516 and the second side portion 317. In other exemplary embodiments, the slot 518 can be defined at the bottom portion 515 and extends to one of the first side portion 516 and the second side portion 317.

The front frame 511 includes a bottom arm (not labeled) corresponding to the bottom portion 515 and two side arms (not labeled) corresponding to the first side portion 516 and the second side portion 517. The front frame 511 defines a first gap 5112 and a second gap 5114 at the bottom arm. The gaps 5112, 5114 are in communication with the slot 518 and extend across the front frame 511. A straight portion of the front frame 511 between the first gap 5112 and the second gap 5114 forms a radiating section 52. In this exemplary embodiment, the first gap 5112 and the second gap 5114 are respectively disposed adjacent to corners on opposite ends of the top arm, the radiating section 52 is a straight arm. In this exemplary embodiment, the slot 518 and the gaps 5112, 5114 are filled with insulating material, for example, plastic, rubber, glass, wood, ceramic, or the like, thereby isolating the radiating section 52 and the backboard 512.

In this exemplary embodiment, except for the slot 518 and the gaps 5112, 5114, an lower half portion of the front frame 511 and the side frame 513 does not define any other slot, break line, and/or gap. That is, there are only the gaps 5112, 5114 defined on the lower half portion of the front frame 511.

Figure 19:
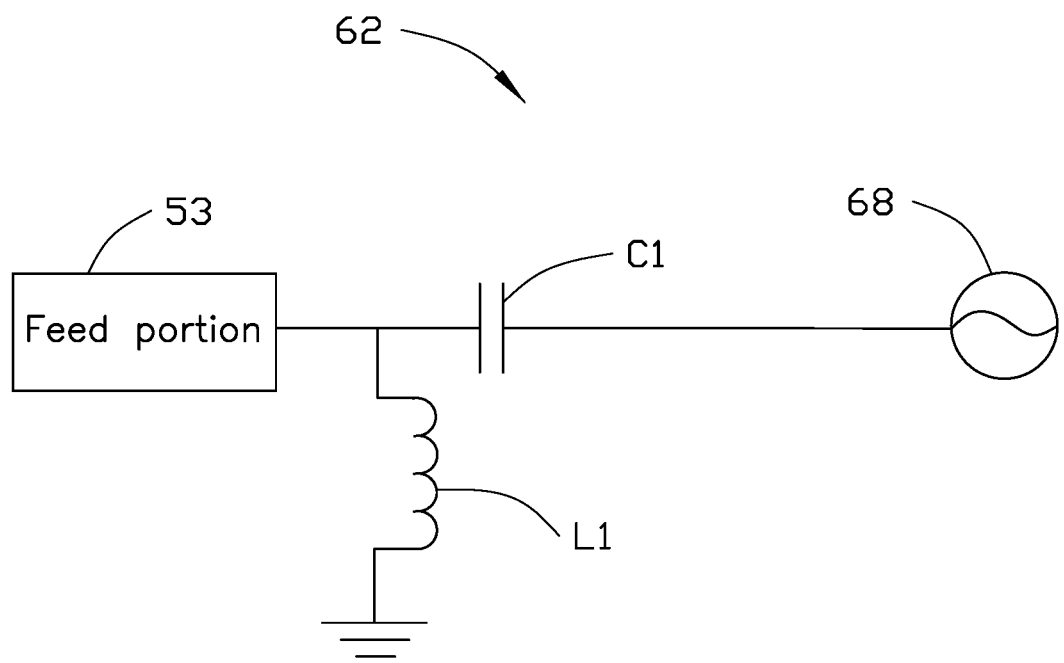
FIG. 19 is a circuit diagram of a first matching circuit of the antenna structure of FIG. 15.

One end of the feed portion 53 connects to the radiating section 52 and is near the second gap 5114, the other end electronically connects to a feed source 68 through the first matching circuit 62 (shown in FIG. 19). Thus, the feed source 68 feeds current into the radiating section 52 through the first matching circuit 62 and the feed portion 53. In this exemplary embodiment, after the current is fed into the feed portion 53, the current flows towards the first gap 5112 and the second gap 5114 along the radiating section 52. Thus, the radiating section 52 is divided into a long portion B1 and a short portion B2. The long portion B1 extends towards the first gap 5112 and the short portion B2 extends towards the second gap 5114 from the connecting point of the feed portion 53. In this exemplary embodiment, the connecting point of the feed portion 53 is not positioned at a middle portion of the radiating section 52. The long portion B1 is longer than the short portion B2.

The first matching circuit 62 is arranged on the printed circuit board 610. Per FIG. 19, the first matching circuit 62 includes a first capacitor C1 and a first inductor L1. One end of the first capacitor C1 electrically connects to the feed portion 53, the other end electrically connects to the feed source 68. One end of the first inductor L1 is electrically connected between the first capacitor C1 and the feed portion 53, the other end electrically connects to the ground. In this exemplary embodiment, a capacitance of the first capacitor C1 can be 1.2 picofarad (pF), an inductance of the first inductor L1 can be 15 nanohenry (nH).

The ground portion 54 is spaced apart from the feed portion 53. One end of the ground portion 54 electrically connects to the long portion B1, the other end electrically connects to the ground through the second matching circuit 64. Per 20, the second matching circuit 64 includes a switching unit 642 and a plurality of switching elements 644. The switching unit 642 is electrically connected to the ground portion 54. Each switching elements 644 can be an inductor, a capacitor, or a combination of the inductor and the capacitor. The switching elements 644 are connected in parallel to each other. One end of each switching element 644 is electrically connected to the switching unit 642. The other end of each switching element 644 is electrically connected to the ground. The switching unit 642 is electrically connected between the ground portion 54 and the switching elements 644. Through controlling the switching unit 642, the long portion B1 can be switched to connect with different switching elements 644. Each switching element 644 has a different impedance.

The first radiating portion 55 electrically connects to the short portion B2 and is adjacent to the second gap 5114. The second radiating portion 56 electrically connects to an end of the front frame 511 opposite to the short portion B2 and is adjacent to the second gap 5114. The first radiating portion 55 and the second radiating portion 56 are spaced apart from each other by the second gap 5114, thus, the first radiating portion 55 and the second radiating portion 56 are on opposite sides of the second gap 5114. The third radiating portion 57 electrically connects to an end of the front frame 511 opposite to the long portion B1 and is adjacent to the first gap 5112.

The feed portion 53 feeds current from the feed source 68 into the radiating section 52 through the first matching circuit 62. The current flows through the long portion B1 and towards the first gap 5112, the ground portion 54, and the second matching circuit 64, thus activating a first mode to generate radiation signals in a first frequency band. In this exemplary embodiment, the first mode is an LTE-A (Long Term Evolution Advanced) low frequency operation mode, the first frequency band is a frequency band of about 704-960 MHz. The feed portion 53 feeds current into the radiating section 52, the current flows through the short portion B2 and towards the second gap 5114, and further flows through the first radiating portion 55, thus activating a second mode to generate radiation signals in a second frequency band. In this exemplary embodiment, the second mode is an LTE-A middle frequency operation mode, the second frequency band is a frequency band of about 1700-1900 MHz. The second radiating portion 56 obtains current from the short portion B2 by coupling, the current flows through the second radiating portion 56, thus activating a third mode to generate radiation signals in a third frequency band. In this exemplary embodiment, the third mode is an LTE-A middle frequency operation mode, the third frequency band is a frequency band of about 1900-2200 MHz. The third radiating portion 57 obtains current from the long portion B1 by coupling, the current flows through the third radiating portion 57, thus activating a fourth mode to generate radiation signals in a fourth frequency band. In this exemplary embodiment, the fourth mode is an LTE-A high frequency operation mode, the fourth frequency band is a frequency band of about 2200-2500 MHz.

Through controlling the switching unit 642, the long portion B1 can be switched to connect with different switching elements 644. Since each switching element 644 has a different impedance, an operating frequency band of the long portion B1 can be adjusted through switching the switching unit 642, for example, the first frequency band can be offset towards a lower frequency or towards a higher frequency (relative to each other).

The fourth radiating portion 58 is substantially L-shaped and spaced apart from the long portion B1. One end of the fourth radiating portion 58 away from the long portion B1 electrically connects to the feed source 69 through the third matching circuit 66. The third matching circuit 66 is arranged on the printed circuit board 610. Per FIG. 21, the third matching circuit 66 includes a second capacitor C2 and a second inductor L2. One end of the second capacitor C2 electrically connects to the fourth radiating portion 58, the other end electrically connects to the feed source 69. One end of the second inductor L2 is electrically connected between the feed source 69 and the second capacitor C2, the other end electrically connects to the ground. The fourth radiating portion 58 receives current from the feed source 69 through the third matching circuit 66, the current flows through the fourth radiating portion 58, thus activating a fifth mode to generate radiation signals in a fifth frequency band. In this exemplary embodiment, the fifth mode is an LTE-A high frequency operation mode, the fifth frequency band is a frequency band of about 2500-2700 MHz. In this exemplary embodiment, a capacitance of the second capacitor C2 is 1.2 pF, an inductance of the second inductor L2 is 15 nH. In other embodiments, the third matching circuit 66 and the feed source 69 can be omitted, the fourth radiating portion 58 obtains current from the long portion B1 by coupling.

The backboard 512 serves as the ground of the antenna structure 500. Perhaps, a middle frame or a shielding mask (not shown) also may serves as the ground of the antenna structure 500, the middle frame can be a shielding mask for shielding electromagnetic interference arranged on the display 601 facing the backboard 512. The shielding mask or the middle frame can be made of metal material. The shielding mask or the middle frame may connect to the backboard 512 to form a greater ground for the antenna structure 500. In summary, each ground portion directly or indirectly connects to the ground.

In this exemplary embodiment, to obtain preferred antenna characteristics, a width of the slot 518 can be 3.9 millimeter, that is a distance between the backboard 512 and the radiating section 52 can be 3.9 millimeter, the width of the slot 518 can be adjusted in a range of about 3-4.5 millimeter, thus to improve antenna characteristic for the radiating sections by being spaced apart from the backboard 512. A width of each of the gaps 5112, 5114 can be 2 millimeter and can be adjusted in a range of about 1.5-2.5 millimeter, which may further improve antenna characteristic for the radiating sections. A thickness of the front frame 511 can be 1.5 millimeter, that is a thickness of the gaps 5112, 5114 can be 1.5 millimeter.

Figure 18:
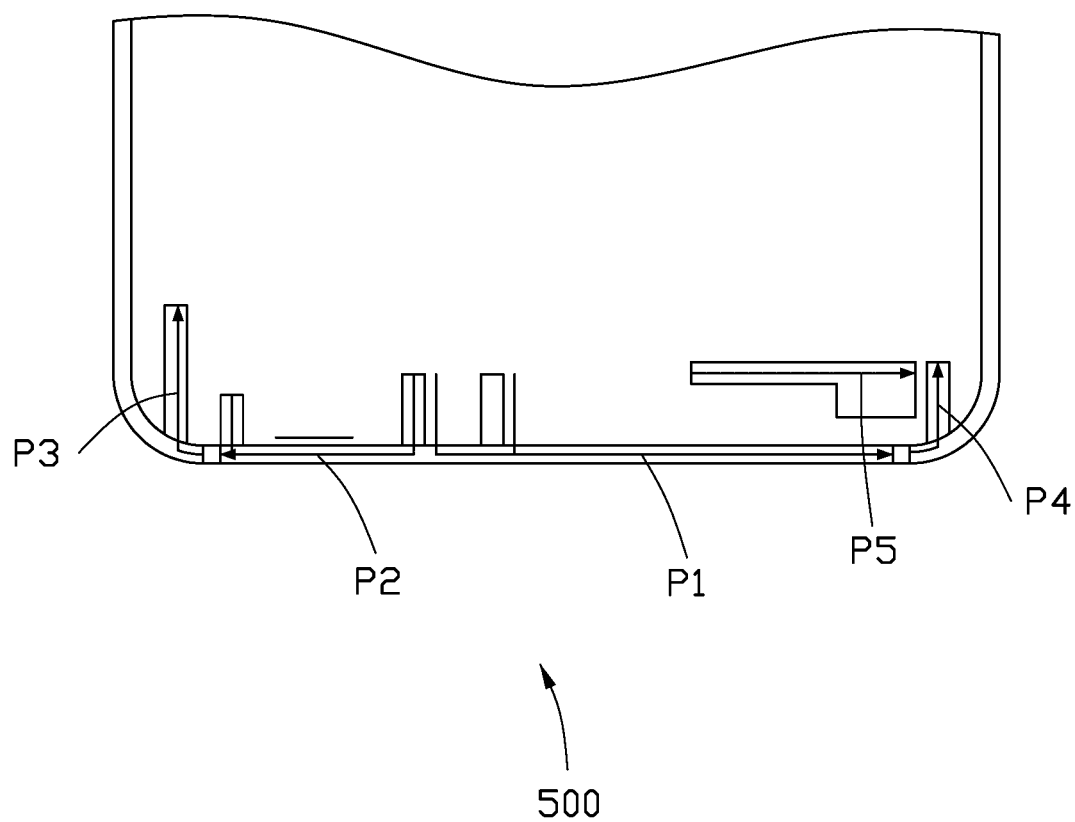
FIG. 18 is a current path distribution graph when the antenna structure of FIG. 15 is in operation.

Per FIG. 18, when the current enters the radiating section 52 from the feed portion 53, the current flows towards two direction, one direction flows through the long portion B1 and towards the first gap 5112 and the ground portion 54 (please see a path P1), thus, activating the LTE-A low frequency operation mode (704-960 MHz). When the current enters the radiating section 52 from the feed portion 53, another direction flows through the short portion B2 and towards the second gap 5114, and flows through the first radiating portion 55 (please see a path P2), thus, activating the LTE-A middle frequency operation mode (1700-1900 MHz). The second radiating portion 56 obtains current from the short portion B2 by coupling, the current flows through the second radiating portion 56 (please see a path P3), thus, activating the LTE-A middle frequency operation mode (1900-2200 MHz). The third radiating portion 57 obtains current from the long portion B1 by coupling, the current flows through the third radiating portion 57 (please see a path P4), thus, activating the LTE-A high frequency operation mode (2200-2500 MHz). The fourth radiating portion 58 feeds in current from the feed source 69 through the third matching circuit 66 or obtains current from the long portion B1 by coupling, the current flows through the fourth radiating portion 58 (please see a path P5), thus, activating the LTE-A high frequency operation mode (2500-2700 MHz).

The feed portion 53 and the ground portion 54 are between the audio jack 602 and the USB connector 603 and spaced apart from each other. The first radiating portion 55 and the second radiating portion 56 are on a side of the audio jack 602 away from the feed portion 53. The first radiating portion 55 and the second radiating portion 56 are spaced apart from each other. The third radiating portion 57 is on a side of the speaker 607. The third radiating portion 57 is between the front frame 511 and the speaker 607. The fourth radiating portion 58 is between the long portion B1 and the speaker 607.

Figure 22:
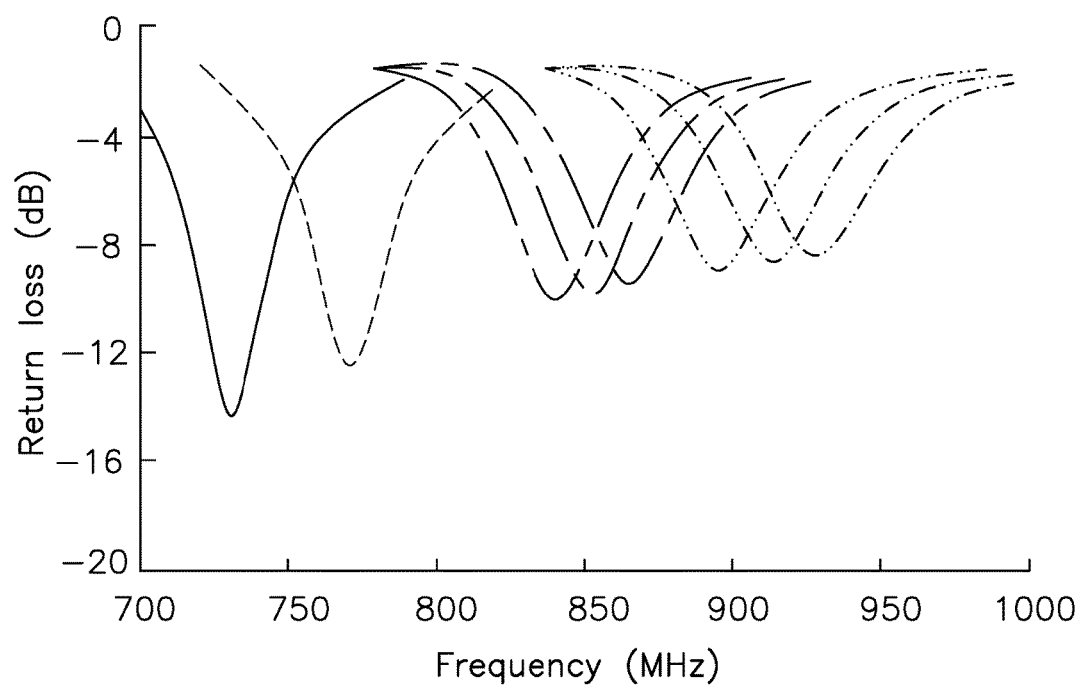
FIG. 22 is a return loss (RL) graph when the antenna structure of FIG. 15 in operation and has the second matching circuit connecting to switching elements with different inductances.

FIG. 22 illustrates a return loss (RL) graph when the antenna structure 500 in operation and has the second matching circuit 64 connecting to switching elements 644 with different inductances. The antenna structure 500 activates the LTE-A low frequency operation mode through the second matching circuit 64 and adjusts the LTE-A low frequency band through connecting to switching elements 644 with different inductances.

Figure 23:
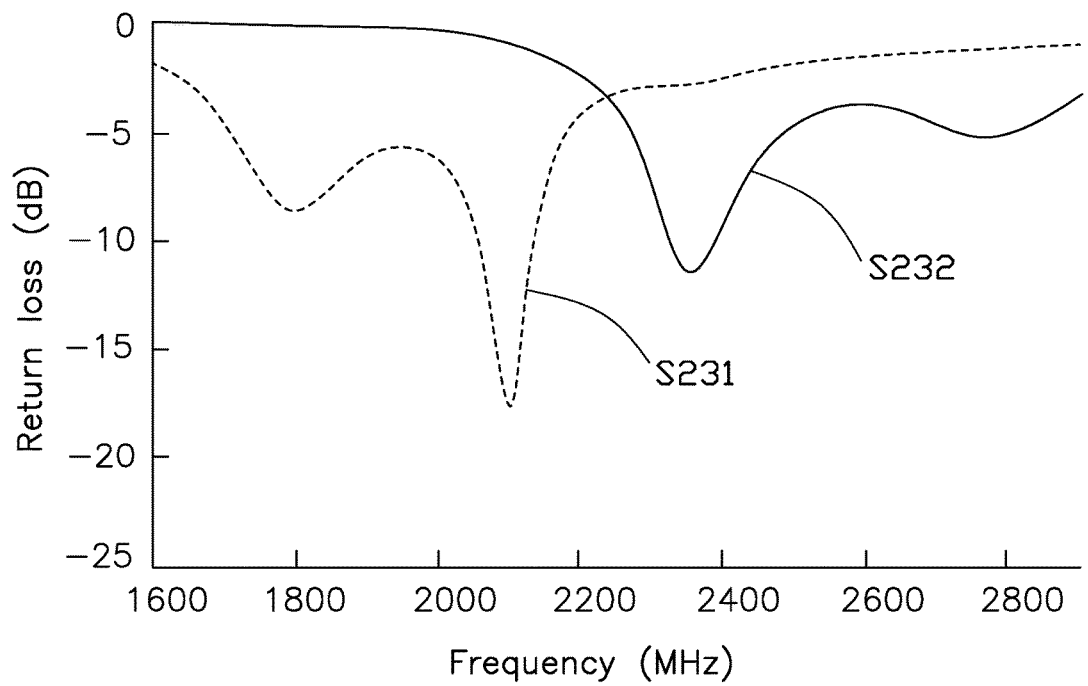
FIG. 23 is a return loss (RL) graph when the antenna structure of FIG. 15 operates at an LTE-A middle frequency operation mode and an LTE-A high frequency operation mode.

FIG. 23 illustrates a return loss (RL) graph when the antenna structure 500 operates at the LTE-A middle frequency operation mode and the LTE-A high frequency operation mode. Curve S231 illustrates a return loss when the antenna structure 500 operates at the LTE-A middle frequency operation mode. Curve S232 illustrates a return loss when the antenna structure 500 operates at the LTE-A high frequency operation mode.

Figure 24:
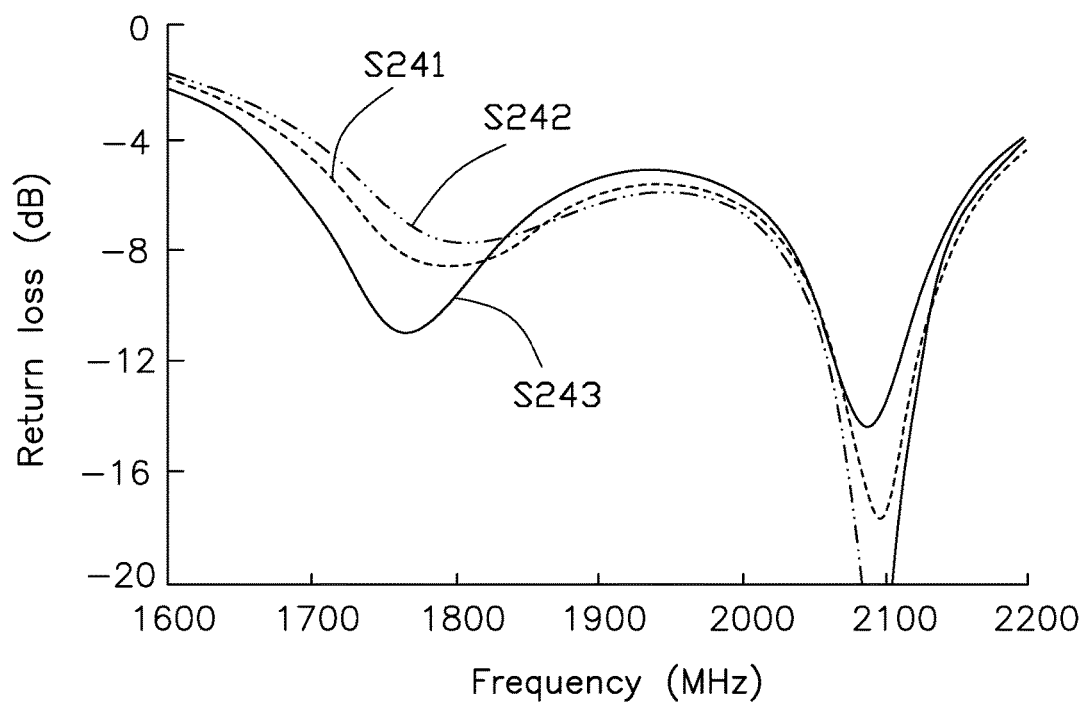
FIG. 24 is a return loss (RL) graph when the antenna structure of FIG. 15 in operation and has a first radiating portion with different sizes.

FIG. 24 illustrates a return loss (RL) graph when the antenna structure 500 in operation and has the first radiating portion 55 with different sizes. Curve S241 illustrates a return loss when the antenna structure 500 in operation and a length of the first radiating portion 55 is 2.2 millimeter. Curve S242 illustrates a return loss when the antenna structure 500 in operation and a length of the first radiating portion 55 is 1.2 millimeter. Curve S243 illustrates a return loss when the antenna structure 500 in operation and a length of the first radiating portion 55 is 3.2 millimeter.

Figure 25:
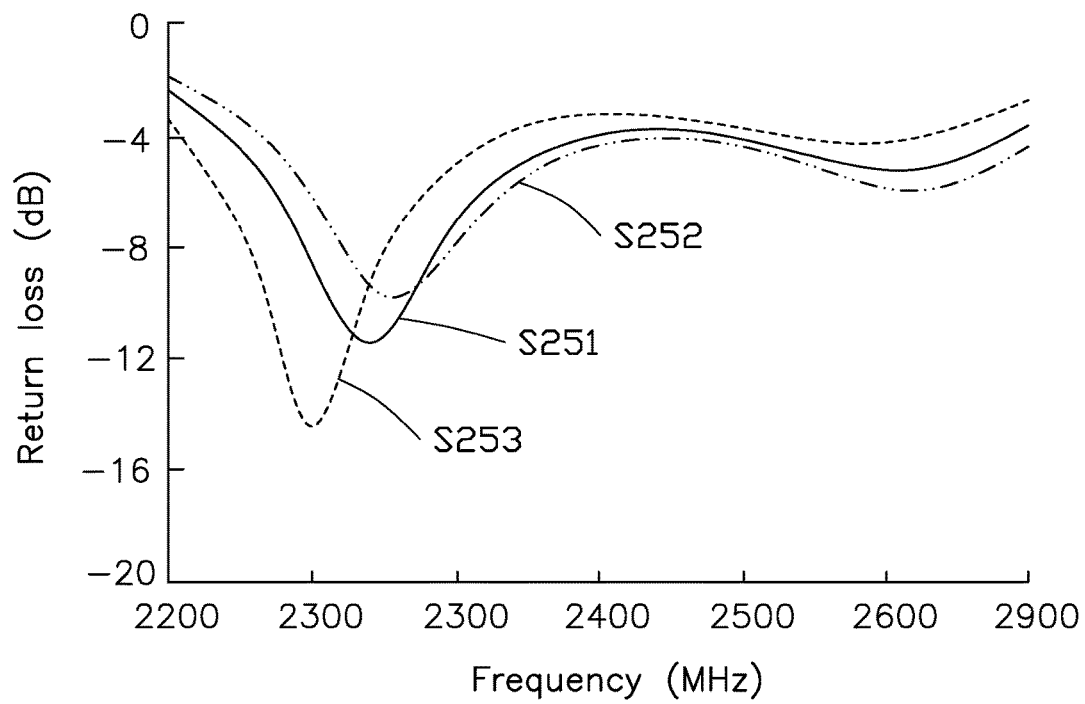
FIG. 25 is a return loss (RL) graph when the antenna structure of FIG. 15 in operation and has a third radiating portion with different sizes.

FIG. 25 illustrates a return loss (RL) graph when the antenna structure 500 in operation and has the third radiating portion 57 with different sizes. Curve S251 illustrates a return loss when the antenna structure 500 in operation and a length of the third radiating portion 57 is 8.6 millimeter. Curve S252 illustrates a return loss when the antenna structure 500 in operation and a length of the third radiating portion 57 is 7.6 millimeter. Curve S253 illustrates a return loss when the antenna structure 500 in operation and a length of the third radiating portion 57 is 9.6 millimeter.

Figure 26:
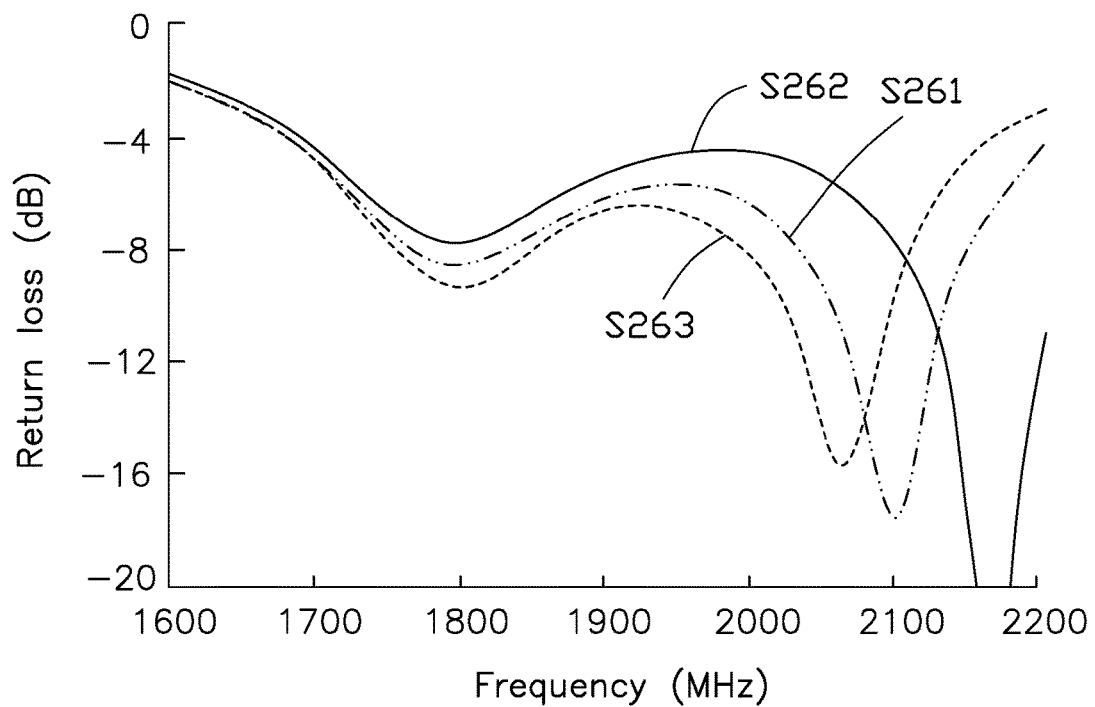
FIG. 26 is a return loss (RL) graph when the antenna structure of FIG. 15 in operation and has a second radiating portion with different sizes.

FIG. 26 illustrates a return loss (RL) graph when the antenna structure 500 in operation and has the second radiating portion 56 with different sizes. Curve S261 illustrates a return loss when the antenna structure 500 in operation and a length of the second radiating portion 56 is 9.8 millimeter. Curve S262 illustrates a return loss when the antenna structure 500 in operation and a length of the second radiating portion 56 is 8.8 millimeter. Curve S263 illustrates a return loss when the antenna structure 500 in operation and a length of the second radiating portion 56 is 10.8 millimeter.

From FIGS. 24-26, the LTE-A middle frequency operation mode can be adjusted by adjusting the size of the first radiating portion 55. The LTE-A middle frequency operation mode can be adjusted by adjusting the size of the second radiating portion 56. The LTE-A high frequency operation mode can be adjusted by adjusting the size of the high radiating portion 57.

Figure 27:
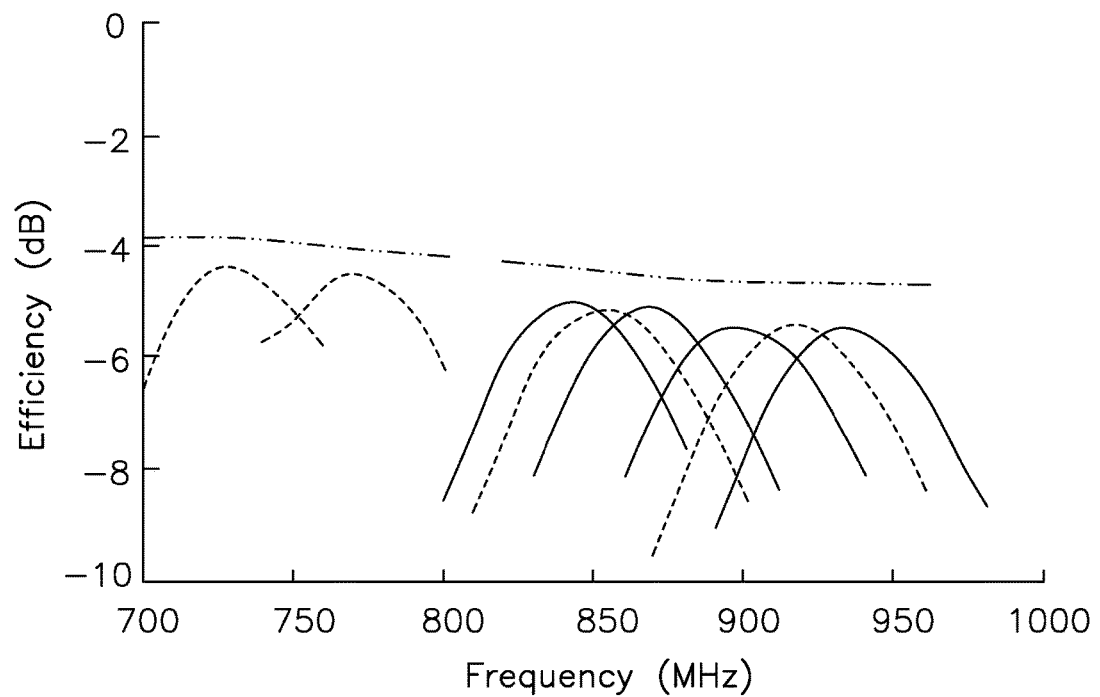
FIG. 27 is a radiating efficiency graph when the antenna structure of FIG. 15 operates at the LTE-A low frequency operation mode.

FIG. 27 illustrates a radiating efficiency graph when the antenna structure 500 operates at the LTE-A low frequency operation mode. The upper line illustrates a radiating efficiency of the antenna structure 500, a plurality of lower lines illustrate radiating efficiencies of the antenna structure 500 having the switching elements 644 with different inductances. The antenna structure 500 covers the frequency band of 700-960 MHz, the radiating efficiency of the antenna structure 500 is greater than −6 dB.

Figure 28:
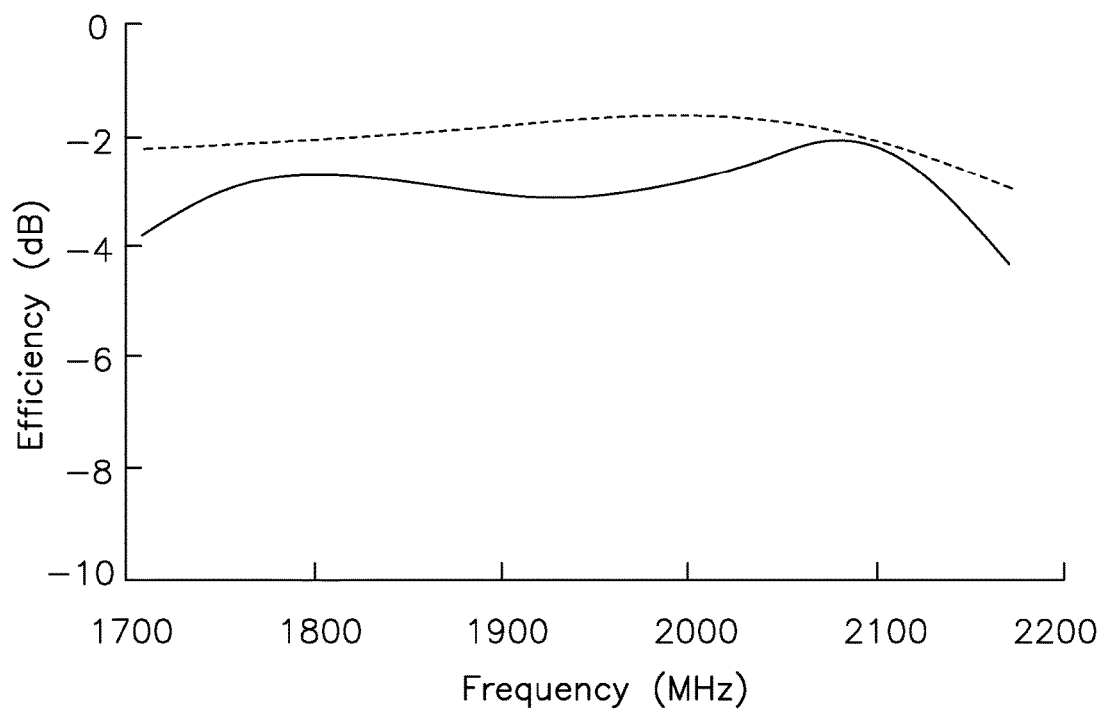
FIG. 28 is a radiating efficiency graph when the antenna structure of FIG. 15 operates at the LTE-A middle frequency operation mode.

FIG. 28 illustrates radiating efficiency graph when the antenna structure 500 operates at the LTE-A middle frequency operation mode. The upper line illustrates a radiating efficiency of the antenna structure 500, the lower line illustrates a total radiating efficiency of the antenna structure 500. The antenna structure 500 covers the frequency band of 1710-2170 MHz, the radiating efficiency of the antenna structure 500 is greater than −3.5 dB.

Figure 29:
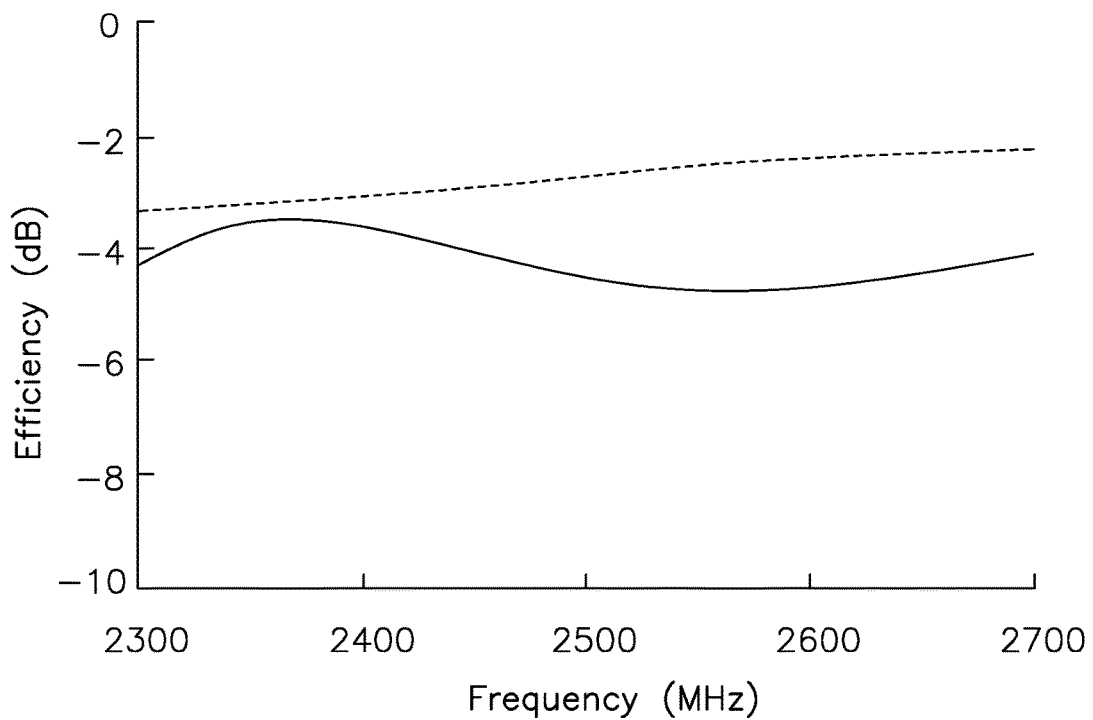
FIG. 29 is a radiating efficiency graph when the antenna structure of FIG. 15 operates at the LTE-A high frequency operation mode.

FIG. 29 illustrates a radiating efficiency graph when the antenna structure 500 operates at the LTE-A high frequency operation mode. The upper line illustrates a radiating efficiency of the antenna structure 500, the lower line illustrates a total radiating efficiency of the antenna structure 500. The antenna structure 500 covers the frequency band of 2300-2690 MHz, the radiating efficiency of the antenna structure 500 is greater than −4.5 dB.

The antenna structure 500 can work at a low frequency band, for example, LTE-A low frequency band (703-960 MHz), at a middle frequency band (1710-2170 MHz), and at a high frequency band (2300-2690 MHz), and when the antenna structure 500 operates at these frequency bands, a working frequency satisfies a design of the antenna and also has a good radiating efficiency.

The antenna structure 500 includes the metallic member 51 and the backboard 512. The metallic member 51 defines the slot on the side frame 513 and the gaps on the front frame 511. The backboard 512 is an integrally formed metallic sheet without other slot, break line, and/or gap, which maintains integrity and aesthetics.

The antenna structure 100 of the first exemplary embodiment can be an upper antenna and the antenna structure 500 of the second exemplary embodiment can be a lower antenna of a wireless communication device. The upper antenna of the first exemplary embodiment and the lower antenna of the second exemplary embodiment may cooperatively form a combination antenna for the wireless communication device. The wireless communication device may transmit wireless signals by the lower antenna, and receive wireless signals by the upper antenna and the lower antenna together.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. An antenna structure comprising:
   a metallic member, the metallic member comprising a front frame, a backboard, and a side frame, the side frame being between the front frame and the backboard;
   a feed portion;

a ground portion; and
a radiating portion;
wherein the side frame defines a slot;
wherein the front frame defines a first gap and a second gap, the first gap and the second gap are between two opposite ends of the slot, the first gap and the second gap are in communication with the slot and extend across the front frame;
wherein a straight portion of the front frame between the first gap and the second gap forms a radiating section; wherein the feed portion and the ground portion are electrically connected to the radiating section; wherein the radiating portion connects to an end of the front frame adjacent to the second gap and opposite to the radiating section; and
wherein current enters the radiating section from the feed portion, the current flows through the radiating section and towards the second gap, the radiating portion obtains current from the radiating section by coupling, the radiating section and the radiating portion generate radiation signals in two different frequency bands.

2. The antenna structure of claim 1, wherein the slot and the gaps are all filled with insulating material.

3. The antenna structure of claim 1, wherein the backboard is directly connected to the side frame and there is no any gap between the backboard and the side frame, the backboard is an integral and single metallic sheet, the backboard does not define any slot, break line, or gap that divides the backboard.

4. The antenna structure of claim 1, further comprising a first matching circuit and a second matching circuit, wherein one end of the feed portion is electrically connected to the radiating section, the other end of the feed portion electrically connects to a feed source through the first matching circuit; the radiating section is divided into a long portion and a short portion by a connecting point of the feed portion, the long portion is longer than the short portion.

5. The antenna structure of claim 4, wherein the first matching circuit includes a first capacitor, a second capacitor, and an adjustable inductor; the feed portion electrically connects to the feed source through the first capacitor; one end of the second capacitor is electrically connected between the feed portion and the first capacitor, the other end of the second capacitor is electrically connects to the ground; one end of the adjustable inductor is electrically connected between the feed portion and the first capacitor, the other end of the adjustable inductor is electrically connects to the ground, the adjustable inductor is switched to have different inductances.

6. The antenna structure of claim 4, wherein the second matching circuit includes a first inductor, a second inductor, and a third capacitor; one end of the first inductor electrically connects to the ground portion, the other end of the first inductor electrically connects to the ground through the third capacitor; one end of the second inductor is electrically connected between the first inductor and the third capacitor, the other end of the second inductor electrically connects to the ground.

7. The antenna structure of claim 4, wherein the feed portion feeds current from the feed source into the radiating section through the first matching circuit, the current flows through the short portion and towards the second gap, and flows through the long portion and towards the first gap, and further flows to the ground portion and the second matching circuit, thus activating a first mode to generate radiation signals in a first frequency band, the first mode comprises an LTE-A (Long Term Evolution Advanced) low frequency operation mode and an LTE-A middle frequency operation mode, the first frequency band comprises a frequency band of about 700-900 MHz and a frequency band of about 1800-1900 MHz.

8. The antenna structure of claim 7, wherein through adjusting the inductance of the adjustable inductor of the first matching circuit, the long portion, the short portion, and the feed portion are switched to connect with the adjustable inductor with different inductances, thus the LTE-A low frequency band is offset towards a lower frequency or towards a higher frequency.

9. The antenna structure of claim 7, wherein the feed portion feeds current from the feed source into the radiating section through the first matching circuit, the current flows through the long portion and towards the first gap, and further flows to the ground portion and the second matching circuit, thus activating a second mode to generate radiation signals in a second frequency band, the second mode is a Global Positioning System (GPS) mode, the second frequency band is a frequency band of about 1575 MHz.

10. The antenna structure of claim 9, wherein the feed portion feeds current from the feed source into the radiating section through the first matching circuit, the current flows through the short portion and towards the second gap, thus activating a third mode to generate radiation signals in a third frequency band, the third mode is an LTE-A high frequency operation mode, the third frequency band is a frequency band of about 2200-2300 MHz.

11. The antenna structure of claim 10, wherein the radiating portion is a first radiating portion, the first radiating portion is a substantially straight arm; the first radiating portion obtains current from the short portion by coupling, thus activating a fourth mode to generate radiation signals in a fourth frequency band, the fourth mode is an LTE-A high frequency operation mode, the fourth frequency band is a frequency band of about 2500-2700 MHz.

12. The antenna structure of claim 11, further comprising a second radiating portion, wherein the second radiating portion includes a first arm and a second arm; the first arm is substantially L-shaped and has one end connecting to an end of the front frame opposite to the radiating section and adjacent to the first gap, the second arm is substantially U-shaped and has one end connecting to an end of the first arm away from the front frame.

13. The antenna structure of claim 12, wherein the second radiating portion obtains current from the long portion by coupling, thus activating a fifth mode to generate radiation signals in a fifth frequency band, the fifth mode comprises a WiFi 2.4G mode and a WiFi 5G mode, the fifth frequency band is a frequency band of about 2450 MHz and 5500 MHz.

14. The antenna structure of claim 11, wherein the LTE-A high frequency band is adjustable through adjusting a size of the first radiating portion, and the frequency bands are adjustable through adjusting connecting positions of the feed portion and the ground portion to the radiating section.

15. The antenna structure of claim 4, wherein the first matching circuit includes a first capacitor and a first inductor, one end of the first capacitor electrically connects to the feed portion, the other end of the first capacitor electrically connects to the feed source; one end of the first inductor is electrically connected between the first capacitor and the feed portion, the other end of the first inductor electrically connects to the ground.

16. The antenna structure of claim 15, wherein second matching circuit includes a switching unit and a plurality of switching elements; each of the switching elements is an inductor, a capacitor, or a combination of the inductor and the capacitor, the switching elements are connected in parallel to each other, one end of each switching element is electrically connected to the switching unit, the other end of each switching element is electrically connected to the ground, the switching unit is electrically connected between the ground portion and the switching elements, through controlling the switching unit, the long portion is switched to connect with different switching elements, each switching element has a different impedance.

17. The antenna structure of claim 16, further comprising a first radiating portion and a third radiating portion, wherein the radiating portion is a second radiating portion, the first radiating portion electrically connects to the short portion and is adjacent to the second gap, the first radiating portion and the second radiating portion are spaced apart from each other by the second gap, the first radiating portion and the second radiating portion are on opposite sides of the second gap, the third radiating portion electrically connects to an end of the front frame opposite to the long portion and adjacent to the first gap.

18. The antenna structure of claim 17, wherein the feed portion feeds current from the feed source into the radiating section through the first matching circuit, the current flows through the long portion and towards the first gap, the ground portion, and the second matching circuit, thus activating a first mode to generate radiation signals in a first frequency band, the first mode is an LTE-A low frequency operation mode, the first frequency band is a frequency band of about 704-960 MHz.

19. The antenna structure of claim 18, wherein through controlling the switching unit, the long portion is switched to connect with different switching elements, since each switching element has a different impedance, the first frequency band of the long portion is offset towards a lower frequency or towards a higher frequency.

20. The antenna structure of claim 18, wherein the feed portion feeds current into the radiating section, the current flows through the short portion and towards the second gap, and further flows through the first radiating portion, thus activating a second mode to generate radiation signals in a second frequency band, the second mode is an LTE-A middle frequency operation mode, the second frequency band is a frequency band of about 1700-1900 MHz.

21. The antenna structure of claim 17, wherein the second radiating portion obtains current from the short portion by coupling, the current flows through the second radiating portion, thus activating a third mode to generate radiation signals in a third frequency band, the third mode is an LTE-A middle frequency operation mode, the third frequency band is a frequency band of about 1900-2200 MHz.

22. The antenna structure of claim 17, wherein the third radiating portion obtains current from the long portion by coupling, the current flows through the third radiating portion, thus activating a fourth mode to generate radiation signals in a fourth frequency band, the fourth mode is an LTE-A high frequency operation mode, the fourth frequency band is a frequency band of about 2200-2500 MHz.

23. The antenna structure of claim 17, further comprising a fourth radiating portion and a third matching circuit, wherein the fourth radiating portion is spaced apart from the long portion, one end of the fourth radiating portion away from the long portion electrically connects to a feed source through the third matching circuit.

24. The antenna structure of claim 23, wherein the third matching circuit includes a second capacitor and a second inductor, one end of the second capacitor electrically connects to the fourth radiating portion, the other end of the second capacitor electrically connects to the feed source, one end of the second inductor is electrically connected between the feed source and the second capacitor, the other end of the second inductor electrically connects to the ground.

25. The antenna structure of claim 23, wherein the fourth radiating portion receives current from the feed source through the third matching circuit, the current flows through the fourth radiating portion, thus activating a fifth mode to generate radiation signals in a fifth frequency band, the fifth mode is an LTE-A high frequency operation mode, the fifth frequency band is a frequency band of about 2500-2700 MHz.

26. A wireless communication device, comprising:
an antenna structure, the antenna structure comprising:
a metallic member, the metallic member comprising a front frame, a backboard, and a side frame, the side frame being between the front frame and the backboard;
a feed portion;
a ground portion; and
a radiating portion;
wherein the side frame defines a slot;
wherein the front frame defines a first gap and a second gap, the first gap and the second gap are between two opposite ends of the slot, the first gap and the second gap are in communication with the slot and extend across the front frame;
wherein a straight portion of the front frame between the first gap and the second gap forms a radiating section; wherein the feed portion and the ground portion are electrically connected to the radiating section; wherein the radiating portion connects to an end of the front frame adjacent to the second gap and opposite to the radiating section; and
wherein current enters the radiating section from the feed portion, the current flows through the radiating section and towards the second gap, the radiating portion obtains current from the radiating section by coupling, the radiating section and the radiating portion generate radiation signals in two different frequency bands.

27. The wireless communication device of claim 26, further comprising dual backside cameras, a receiver, and a front camera, wherein the feed portion is between the dual backside cameras and the receiver; the ground portion is between the receiver and the front camera; the radiating portion is on a side of the dual backside cameras away from the feed portion.

28. The wireless communication device as claim 26, further comprising an audio jack, a USB connector, and a speaker, wherein the feed portion and the ground portion are between the audio jack and the USB connector and spaced apart from each other, the radiating portion is on a side of the audio jack away from the feed portion.

* * * * *